US008098745B2

(12) United States Patent
Bertrand et al.

(10) Patent No.: US 8,098,745 B2
(45) Date of Patent: Jan. 17, 2012

(54) RANDOM ACCESS STRUCTURE FOR WIRELESS NETWORKS

(75) Inventors: Pierre Bertrand, Antibes (FR); Jing Jiang, Allen, TX (US); Shantanu Kangude, Dallas, TX (US); Tarik Muharemovic, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1295 days.

(21) Appl. No.: 11/691,549

(22) Filed: Mar. 27, 2007

(65) Prior Publication Data

US 2007/0230600 A1 Oct. 4, 2007

Related U.S. Application Data

(60) Provisional application No. 60/821,227, filed on Aug. 2, 2006, provisional application No. 60/862,701, filed on Oct. 24, 2006, provisional application No. 60/883,942, filed on Jan. 8, 2007.

(30) Foreign Application Priority Data

Mar. 27, 2006 (EP) .................................. 06290519
Jun. 19, 2006 (EP) .................................. 06291010

(51) Int. Cl.
*H04K 1/10* (2006.01)
(52) U.S. Cl. ........ 375/260; 375/130; 375/295; 375/267; 375/364; 375/365; 375/366; 375/368; 375/370; 375/285
(58) Field of Classification Search .................. 375/130, 375/295, 260, 267, 364, 365, 366, 368, 370, 375/285
See application file for complete search history.

(56) References Cited

U.S. PATENT DOCUMENTS

| 7,072,462 | B2 * | 7/2006 | Smith et al. | .................... 379/398 |
| 7,236,554 | B2 * | 6/2007 | Gupta | ........................... 375/355 |
| 7,366,090 | B2 * | 4/2008 | Suh et al. | ...................... 370/208 |
| 7,426,175 | B2 * | 9/2008 | Zhuang et al. | ................. 370/203 |
| 7,822,007 | B2 * | 10/2010 | Jeong et al. | ................... 370/344 |
| 2003/0026200 | A1 * | 2/2003 | Fu et al. | ........................ 370/208 |
| 2004/0170157 | A1 * | 9/2004 | Kim et al. | ..................... 370/349 |

(Continued)

OTHER PUBLICATIONS

Complementaray sets of Chirp-Like polyphase sequences, Electronics Letters, vol. 27, No. 3, p. 254-255, dated Jan. 31, 1991.*

(Continued)

*Primary Examiner* — Siu Lee
(74) *Attorney, Agent, or Firm* — Ronald O. Neerings; Wade James Brady, III; Frederick J. Telecky, Jr.

(57) ABSTRACT

Apparatus and methods for accessing a wireless telecommunications network by transmitting a random access signal. The random access signal includes a random access preamble signal selected from a set of random access preamble signals constructed by cyclically shift selected root CAZAC sequences. The random access signal may be one or more transmission sub-frames in duration, the included random access preamble sequence's length being extended with the signal to provide improved signal detection performance in larger cells and in higher interference environments. The random access signal may include a wide-band pilot signal facilitating base station estimation of up-link frequency response in some situations. Each of the plurality of available random access preamble sequences may be assigned a unique information value. The base station may use the information encoded in the random access preamble to prioritize responses and resource allocations. Random access signal collisions are dealt with by a combination of preamble code space randomness and back-off procedures.

41 Claims, 16 Drawing Sheets

U.S. PATENT DOCUMENTS

| | | | | |
|---|---|---|---|---|
| 2004/0224691 | A1* | 11/2004 | Hadad | 455/442 |
| 2005/0084030 | A1* | 4/2005 | Zhou et al. | 375/267 |
| 2006/0035643 | A1* | 2/2006 | Vook et al. | 455/450 |
| 2006/0039451 | A1* | 2/2006 | Zhuang et al. | 375/145 |
| 2006/0050799 | A1* | 3/2006 | Hou et al. | 375/260 |
| 2006/0056528 | A1* | 3/2006 | Jung et al. | 375/260 |
| 2007/0189404 | A1* | 8/2007 | Baum et al. | 375/260 |
| 2007/0195906 | A1* | 8/2007 | Kim et al. | 375/267 |
| 2007/0230600 | A1* | 10/2007 | Bertrand et al. | 375/260 |

OTHER PUBLICATIONS

Nortel Networks: "On the Signal Structures of Non-synchronized RACH", 3GPP TSG RAN Meeting #46, No. R1-062139, Aug. 28, 2006, XP002422893 Tallinn, Estonia.

Panasonic, NTT DOCOMO: "Random Access Burst Design for E-UTRA", 3GPP TSG RAN WG1 Meeting #46, No. R1-062175, Aug. 28, 2006, XP002422894, Tallinn, Estonia.

Ericsson: "E-UTRA Scalability of Random Access Preamble with Cyclic Prefix", TSG-RAN WG1 Meeting #46, No. R1-062274, Aug. 28, 2006, XP002422895, Tallinn, Estonia.

LGE: "RACH Sequence Extension Methods for Large Cell Deployment", 3GPP TSG RAN1 LTE WG1 Meeting #46, No. R1-062306, Aug. 28, 2006, XP002422896, Tallinn, Estonia.

Texas Instruments: "Non-synchronized Random Access Coverage Analysis for E-UTRA", 3GPP TSG RAN WG1 Meeting #46, No. R1-062003, Aug. 28, 2006, pp. 1/4-4/4, XP002422897, Tallinn, Estonia.

Texas Instruments: "Non-synchronized Random Access Sequence Design for E-UTRA", 3GPP TSG RAN WG1 Meeting #46, No. R1-062004, Aug. 28, 2006, pp. 1/4-4/4, XP002422898, Tallinn, Estonia.

3RD Generation Partnership Project; Technical Specification Group Radio Access Network: "Physical Layer Aspects for Evolved Universal Terrestrial Radio Access (UTRA)", 3GPP TR 25.814 V7.0.0 Release 7, Jun. 2006, pp. 78-84, XP002422899, Sophia Antipolis, FR, Section 9.1.2.1.1.

* cited by examiner

RANDOM ACCESS STRUCTURE FOR WIRELESS NETWORKS

CROSS-REFERENCE TO RELATED APPLICATIONS

The present application claims priority to and hereby incorporates by reference: U.S. provisional patent application Serial No. 60/821,227, filed Aug. 2, 2006, and entitled "Non Synchronized Random Access Structure For Long-Term Evolution Wireless Networks"; U.S. provisional patent application Serial No. 60/862,701, filed Oct. 24, 2006, and entitled "Random Access Channel Design with Hybrid CDM and FDM Multiplexing of Access Opportunities"; and U.S. provisional patent application Serial No. 60/883,942 filed Jan. 8, 2007 and entitled "Random Access Channel Design with Hybrid CDM and FDM Multiplexing of Access Opportunities". The present application additionally claims priority to and incorporates by reference EP provisional application No. 06290519.5, filed on Mar. 27, 2006; and EP provisional application 06291010.4, filed on Jun. 19, 2006; and EP provisional application No. 06291004.7, filed on Jun. 19, 2006.

BACKGROUND

As wireless systems proliferate, the expanding user base and the demand for new services necessitate the development of technologies capable of meeting users' ever increasing expectations. Users of mobile telecommunications devices expect not only globally available reliable voice communications, but a variety of data services, such as email, text messaging, and internet access.

Consequently, the random access channel is intended to encompass a wider range of functionalities than in previous or current cellular networks, thus increasing its expected load. Further, the random access signal, through which the UE initiates the random access procedure, must reliably accommodate variable cell sizes, and provide the Node B with sufficient information to effectively prioritize resource requests. Also, because of its potentially non-synchronized nature, the random access signal must be designed to minimize interference with other UL orthogonal transmissions. Thus, a more efficient random access method is needed.

SUMMARY

One illustrative embodiment for more efficient random access is provided by an apparatus for transmitting a random access signal comprising a CAZAC root sequence selector coupled to a CAZAC root sequence generator, wherein the CAZAC root sequence generator generates at least one CAZAC root sequences, and wherein the CAZAC root sequence selector autonomously selects a preamble root sequence from the at least one CAZAC root sequences.

Another illustrative embodiment may be a method of accessing a wireless network comprising transmitting a signal; said signal comprising a CAZAC sequence autonomously selected from a plurality of CAZAC sequences.

Yet another illustrative embodiment of the present disclosure may be a method for allocating up-link resources comprising: receiving a signal comprising at least one of CAZAC sequence selected from a plural of CAZAC sequences and a wide-band pilot signal, analyzing said signal to estimate the frequency response of the up-link transmission channel, and allocating up-link resources based on said frequency response estimation.

BRIEF DESCRIPTION OF THE DRAWINGS

In the following detailed description, reference will be made to the accompanying drawings, in which.

Figure 1:
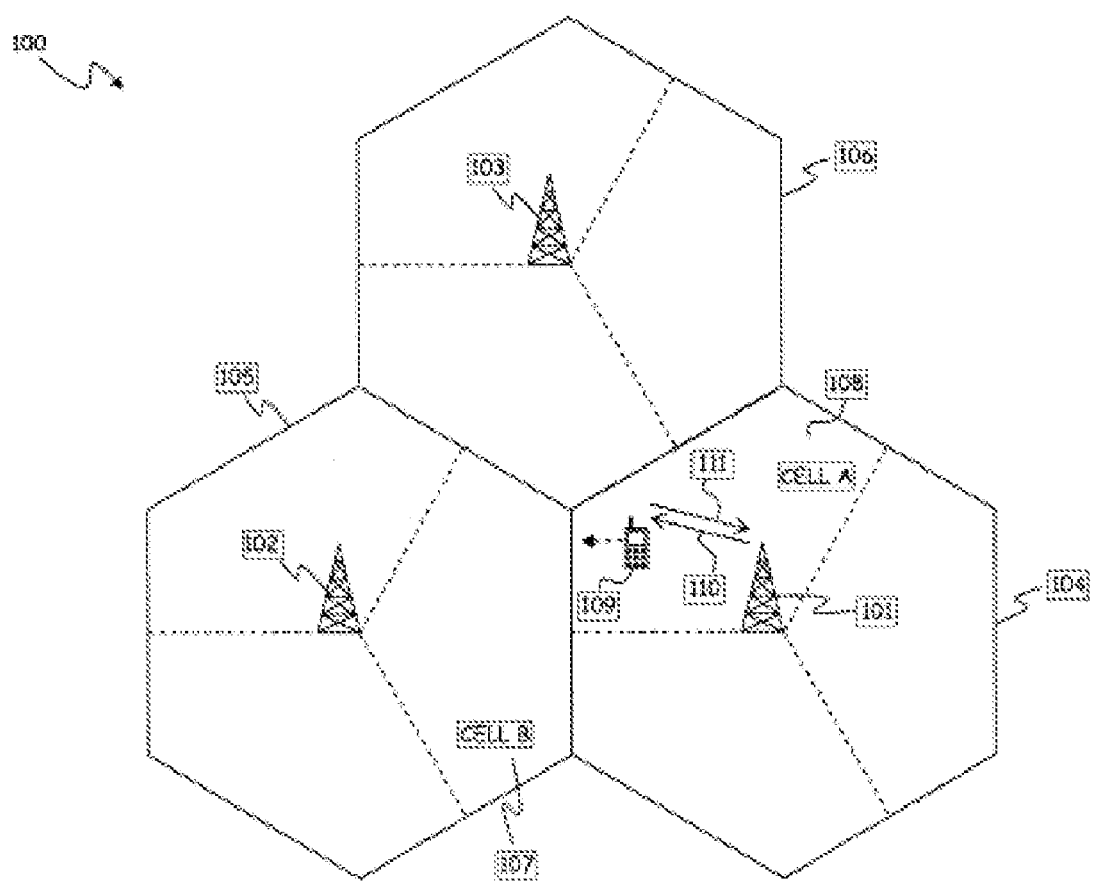
FIG. 1 shows an illustrative telecommunications network.

The drawings show illustrative embodiments that will be described in detail. However, the description and accompanying drawings are not intended to limit the claimed present disclosure to the illustrative embodiments, but to the contrary, the intention is to disclose and protect all modifications, equivalents, and alternatives falling within the spirit and scope of the appended claims.

DETAILED DESCRIPTION

Disclosed herein are various systems and methods for employing a random access channel in a telecommunications system. The disclosed apparatus and methods include:

Apparatus for transmitting and receiving random access signals.

A method for improving up-link resource allocation by utilizing the random access preamble signal or a wideband pilot signal in the random access signal;

A method for encoding information in the random access signal by selecting random access preamble signals or frequency bands;

A method of up-link resource allocation using the information encoded in the random access preamble signal or frequency bands;

A method enabling fast load balancing using the information encoded in the random access preamble signal or frequency bands;

A method of adapting the random access signal to variable cell sizes, noise, interference conditions, etc. by extending the random access preamble signal duration;

A method of optimizing the number of recognizable random access attempts for a given time frequency radio resource;

A method of minimizing interference between random and scheduled accesses;

Methods for adapting prime length random access preamble signals for use in random access signals; and A method of random access signal collision recovery.

Embodiments of the present disclosure are directed, in general, to wireless communication systems, and can be applied to generate random access transmissions. Random access transmission denotes a transmission by the mobile terminal, of at least one signal, from a plurality of pre-defined signals. The plurality of pre-defined signals is specified by the random access structure. Mobile terminal may also be referred to as the User Equipment ("UE"), and in general, may be a fixed or portable wireless device, a cellular phone, a personal digital assistant, a wireless modem card, and so on. Random access transmissions may also be referred to as ranging transmissions, or other analogous terms.

User Equipment may be either up-link ("UL") synchronized or UL non-synchronized. When the UE UL has not been time synchronized, or has lost time synchronization, the UE can perform a non-synchronized random access to request allocation of up-link resources. Additionally, a UE can perform non-synchronized random access to register itself at the access point, or for numerous other reasons. Possible uses of random access transmission are many, and do not restrict the scope of the present disclosure. For example, the non-synchronized random access allows the access point ("Node B") to estimate, and if necessary, to adjust the UE's transmission timing, as well as to allocate resources for the UE's subsequent up-link transmission. Resource requests from UL non-synchronized UEs may occur for a variety of reasons, for example: new network access, data ready to transmit, or handover procedures. A Node B is generally a fixed station and may be called a base transceiver system (BTS), an access point, a base station, or various other names.

FIG. 1 shows an exemplary wireless telecommunications network 100. The illustrative telecommunications network includes base stations 101, 102, and 103, though in operation, a telecommunications network necessarily includes many more base stations. Each of base stations 101, 102, and 103 are operable over corresponding coverage areas 104, 105, and 106. Each base station's coverage area is further divided into cells. In the illustrated network, each base station's coverage area is divided into three cells. Handset or other UE 109 is shown in Cell A 108, which is within coverage area 104 of base station 101. Base station 101 is transmitting to and receiving transmissions from UE 109. As UE 109 moves out of Cell A 108, and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up-link 111 time or frequency or code resources. If UE 109 has data ready for transmission, for example, traffic data, measurements report, tracking area update, etc., UE 109 can transmit a random access signal on up-link 111. The random access signal notifies base station 101 that UE 109 requires up-link resources to transmit the UE's data. Base station 101 responds by transmitting to UE 109, via down-link 110, a message containing the parameters of the resources allocated for UE 109 up-link transmission along with a possible timing error correction. After receiving the resource allocation and a possible timing advance message transmitted on down-link 110 by base station 101, UE 109 (possibly) adjusts its transmit timing and transmits the data on up-link 111 employing the allotted resources during the prescribed time interval.

Figure 2:
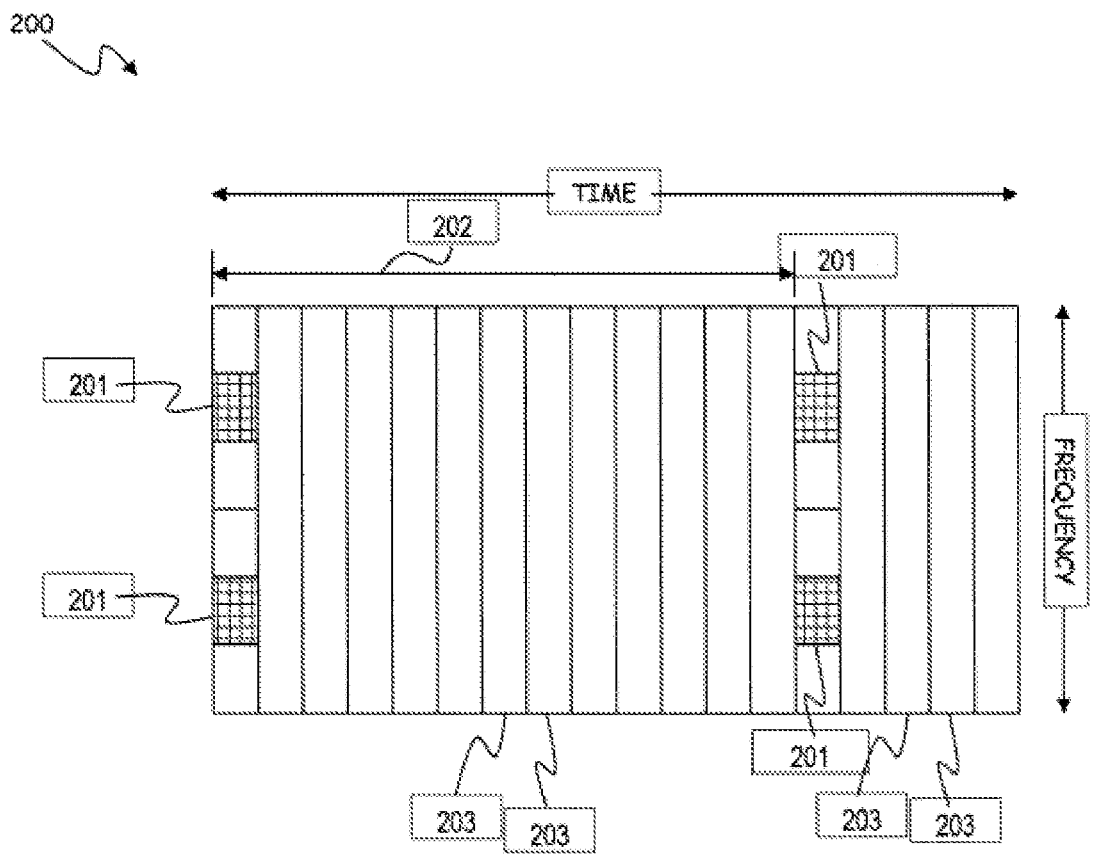
FIG. 2 shows an illustrative up-link time/frequency allocation.

FIG. 2 illustrates an exemplary up-link transmission frame 202, and the allocation of the frame to scheduled and random access channels. The illustrative up-link transmission frame 202, comprises a plurality of transmission sub-frames. Sub-frames 203 are reserved for scheduled UE up-link transmissions. Interspersed among scheduled sub-frames 203, are time and frequency resources allocated to random access channels 201. In the illustration of FIG. 2, a single sub-frame supports two random access channels. Note that the illustrated number and spacing of random access channels is purely a matter of convenience; a particular transmission frame implementation may allocate more or less resource to random access channels. Including multiple random access channels allows multiple UEs to simultaneously transmit a random access burst without collision. However, because each UE independently chooses the random access channel on which it transmits, collisions between UE random access signals may occur. Such collisions call for resolution.

Figure 3:
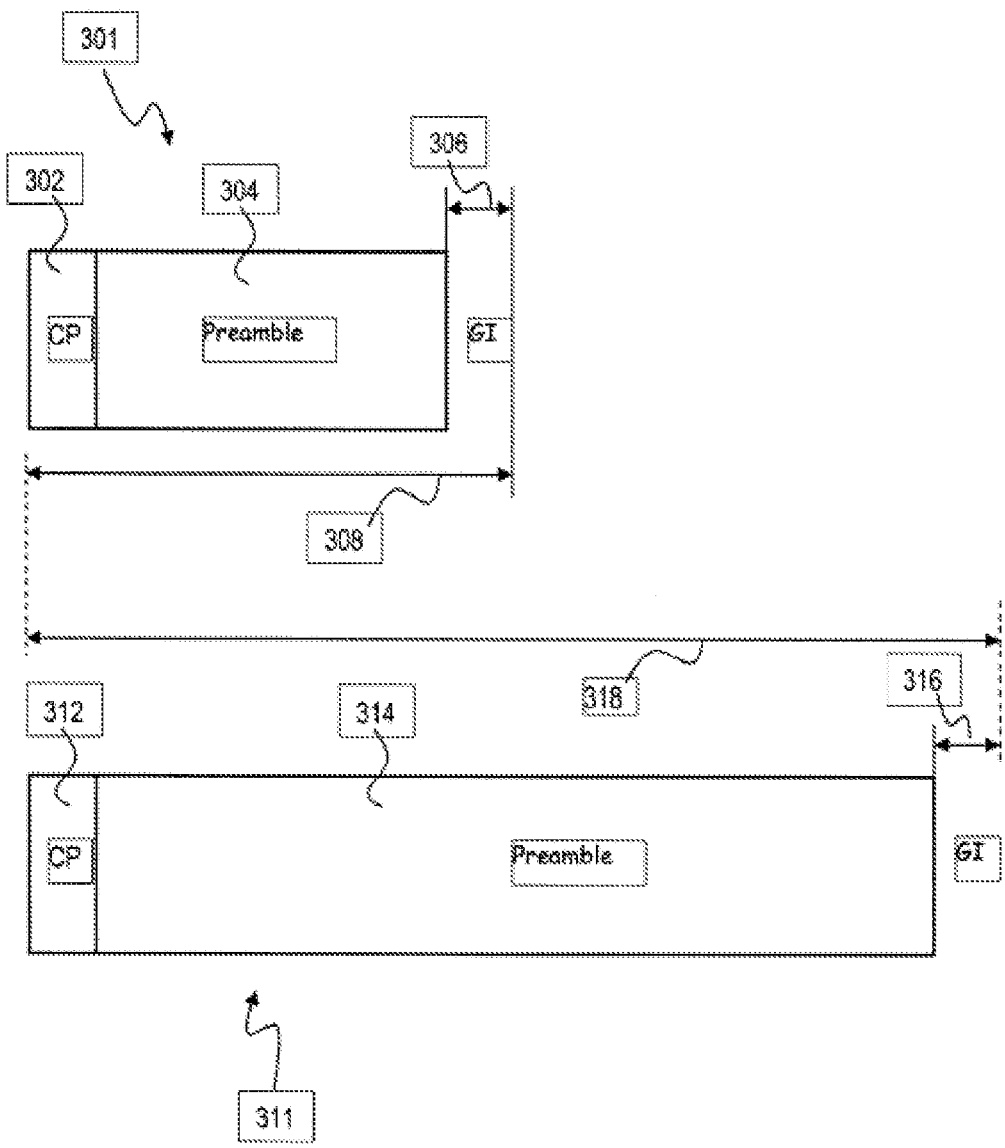
FIG. 3 shows illustrative 1 and 2 sub-frame random access signals.

FIG. 3 illustrates one embodiment of a random access signal. Random access signal 301 occupies a single sub-frame 308, while random access signal 311 occupies two sub-frames. In the illustrative embodiment of one sub-frame random access signal 301, duration 302 is included prior to transmission of random access preamble signal 304 to prevent interference between random access preamble signal 304 and any transmission on the random access preamble signal frequency bands during the previous sub-frame. The duration 302, the details of which are not further pertinent to the novelty of the present disclosure, may or may not be realized as a cyclic prefix ("CP") attached at the preamble start to allow simplified frequency-domain receiver implementation. Random access preamble signal 304 follows duration 302. Random access preamble signal 304 is designed to maximize the probability of preamble detection by the Node B and to minimize the probability of false preamble detections by the Node B, while maximizing the total number of resource opportunities.

Embodiments of the present disclosure utilize constant amplitude zero autocorrelation ("CAZAC") sequences to generate the random access preamble signal. CAZAC sequences are complex-valued sequences with following two properties: 1) constant amplitude (CA), and 2) zero cyclic autocorrelation (ZAC). Well-known examples of CAZAC sequences include (but are not limited to): Chu Sequences, Frank-Zadoff Sequences, Zadoff-Chu (ZC) Sequences, and Generalized Chirp-Like (GCL) Sequences.

As is well known in the art, Zadoff-Chu ("ZC") sequences, as defined by:

$a_M(k) = \exp[j2\pi(M/N)[k(k+1)/2+qk]]$ for N odd $a_M(k) = \exp[j2\pi(M/N)[k^2/2+qk]]$ for N even are representative examples of CAZAC sequences. In the above formula, "M" and "N" are relatively prime, and "q" is any fixed integer. Also, "N" is the length of the sequence, "k" is the index of the sequence element, and "M" is the index of the root ZC sequence. Making "N" a prime number maximizes the set of non-orthogonal root ZC sequences having optimal cross-correlation. Thus, when "N" is prime, there are "(N−1)" possible choices for "M," where each choice results in a distinct root ZC CAZAC sequence. In this disclosure, the terms: Zadoff-Chu, ZC, and ZC CAZAC, are used interchangeably. The term CAZAC denotes any CAZAC sequence, ZC or otherwise.

In the primary embodiment of the present disclosure, random access preamble signal 304 (or 314) is constructed from a CAZAC sequence, such as a ZC sequence. Additional modifications to the selected CAZAC sequence can be performed using any of the following operations: multiplication by a complex constant, DFT, IDFT, FFT, IFFT, cyclic shifting, zero-padding, sequence block-repetition, sequence truncation, sequence cyclic-extension, and others. Thus, in the primary embodiment of the present disclosure, a UE constructs random access preamble signal (304 or 314), by selecting a CAZAC sequence, possibly applying a combination of the described modifications to the selected CAZAC sequence, modulating the modified sequence, and transmitting the resulting random access signal over the air.

In practical systems, there is a need to specify or pre-define the set of allowed random access preamble signals. Thus, a UE autonomously selects (or can be allocated) at least one random access preamble signal (304 or 314) from the pre-defined set of random access preamble signals. Subsequently, UE transmits the selected signal over the air. Node B searches within the finite pre-defined set of random access signals, and is therefore able to detect an occurrence of a random access transmission by the UE.

One method of pre-defining the set of random access preamble signals is to allow a selection of modifications to a fixed root CAZAC sequence, such as a ZC CAZAC sequence. For example, in one embodiment of the present disclosure, distinct random access preamble signals are constructed by applying distinct cyclic shifts when performing the modification of a root CAZAC sequence. Thus, in this embodiment of the present disclosure, UE autonomously selects the random preamble access signal by selecting a value for the cyclic shift. The selected value of the cyclic shift is applied during the process of modification of the root CAZAC sequence. For sequence [$c(0) c(1) c(2) \ldots c(L-1)$], the corresponding cyclically shifted sequence is [$c(n) c(n+1) c(n+2) \ldots c(L-1) c(0) c(1) \ldots c(n-1)$], where "n" is the value of the cyclic shift. Thus, in this embodiment, the set of possible cyclic shifts defines the set of allowed random access preamble signals.

An alternate method of pre-defining the set of random access preamble signals is to permit a selection of applicable root CAZAC sequences, such as ZC sequences. For example, in this embodiment of the present disclosure, distinct random access preamble signals are constructed by applying pre-defined common modifications to distinct root CAZAC sequences. Consequently, UE autonomously selects the random access preamble signal by selecting a distinct root CAZAC sequence, which UE then modifies to produce the random access preamble signal. Thus, in this alternate embodiment of the present disclosure, the set of allowed root CAZAC sequences also defines the set of allowed random access preamble signals.

In a general embodiment of the present disclosure, the set of allowed random access preamble signals is defined by two other sets: 1) a set of allowed root CAZAC sequences, and 2) a set of allowed modifications to a given root CAZAC sequence. For example, in this general embodiment of the present disclosure, random access preamble signal is constructed by first selecting the root ZC CAZAC sequence, and second, by selecting the value of the cyclic shift. Selections can be performed autonomously by the UE, and the UE applies the selected value of the cyclic shift during the process of modification of the selected root ZC CAZAC sequence.

Figure 4:
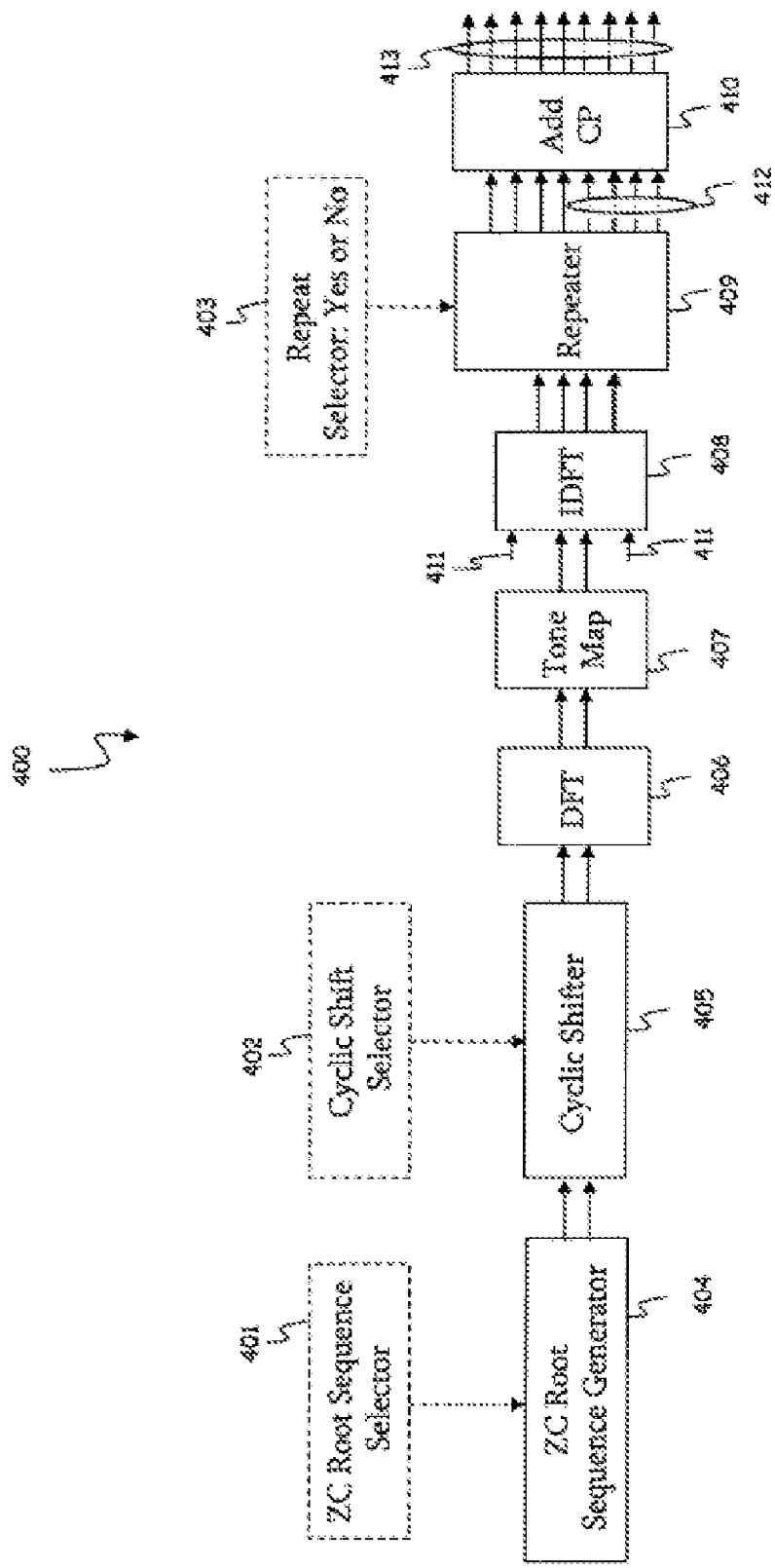
FIG. 4 shows a first illustrative embodiment of a random access signal transmitter.

FIG. 4 is a block diagram showing an apparatus in accordance with an embodiment of the present disclosure. Apparatus 400 comprises ZC Root Sequence Selector 401, Cyclic Shift Selector 402, Repeat Selector 403, ZC Root Sequence Generator 404, Cyclic Shifter 405, DFT in 406, Tone Map 407, other signals or zero-padding in 411, IDFT in 408, Repeater in 409, optional repeated samples 412, Add CP in 410, and the random access signal in 413. Elements of the apparatus may be implemented as components in a fixed or programmable processor. In some embodiments, the IDFT block in 408 may be implemented using an Inverse Fast Fourier Transform (IFFT), and the DFT block in 406 may be implemented using a Fast Fourier Transform (FFT). Apparatus 400 is used to select and perform the random access preamble signal transmission as follows. The UE performs selection of the ZC CAZAC root sequence using the ZC Root Sequence Selector 401 and the selection of the cyclic shift value using the Cyclic Shift Selector 402. Next, UE generates the ZC sequence using the ZC Root Sequence Selector 404. Then, if necessary, the UE performs cyclic shifting of the selected ZC sequence using the Cyclic Shifter 405. The UE performs DFT (Discrete Fourier Transform) of the cyclically shifted ZC sequence in DFT 406. The result of the DFT operation is mapped onto designated set of tones (sub-carriers) using the Tone Map 407. Additional signals or zero-padding 411, may or may not be present. The UE next performs IDFT of the mapped signal using the IDFT 408. The size of the IDFT in 408 may optionally be larger than the size of DFT in 406. Block-Repetition of the IDFT-ed signal is optional, and performed using 409. Note that the repeated signals 412 represent optional repeated samples. This repetition can be applied when the preamble transmission occupies two or more sub-frames. An optional cyclic prefix (CP) can be added using 410, to arrive at the random access signal 413. The random access signal 413 is transmitted over the air.

Figure 5:
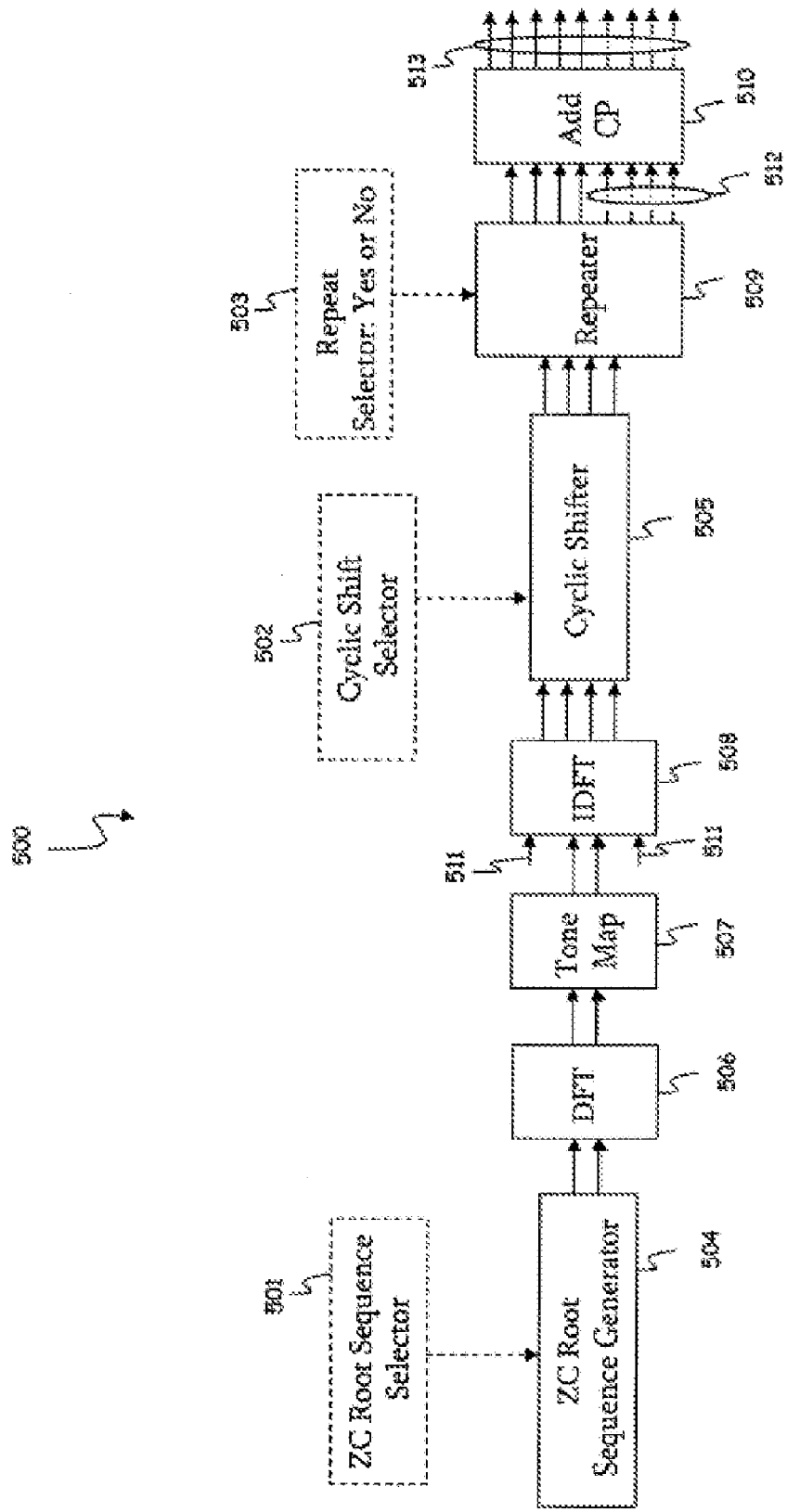
FIG. 5 shows a second illustrative embodiment of a random access signal transmitter.

FIG. 5 is a block diagram showing an apparatus in accordance with an alternative embodiment of the present disclosure. Apparatus 500 comprises ZC Root Sequence Selector 501, Cyclic Shift Selector 502, Repeat Selector 503, ZC Root Sequence Generator 504, Cyclic Shifter 505, DFT in 506, Tone Map 507, other signals or zero-padding in 511, IDFT in 508, Repeater in 509, optional repeated samples 512, Add CP in 510, and the random access signal in 513. Elements of the apparatus may be implemented as components in a fixed or programmable processor. In some embodiments, the IDFT block in 508 may be implemented using an Inverse Fast Fourier Transform (IFFT), and the DFT block in 506 may be implemented using a Fast Fourier Transform (FFT). Apparatus 500 is used to select and perform the random access preamble signal transmission as follows. The UE performs selection of the ZC CAZAC root sequence using the ZC Root Sequence Selector 501 and the selection of the cyclic shift value using the Cycle Shift Selector 502. Then, UE generates the ZC sequence using the ZC Root Sequence Generator 504. The selected ZC sequence is transformed using DFT in 506. The result of the DFT operation is then mapped onto designated set of tones (sub-carriers) using the Tone Map 507. Additional signals or zero-padding 511, may or may not be present. The UE then performs IDFT of the mapped signal using 508. Using the Cyclic Shifter 505, the selected value of the cyclic shift is applied to the IDFT-ed signal. The value of the cyclic shift is obtained from the Cyclic Shift Selector 502. Block-Repetition of the cyclically shifted IDFT-ed signal is optional, and performed using the Repeater 509. Note that 512 represents optional repeated samples. This repetition can be applied when the preamble transmission occupies two or more sub-frames. An optional cyclic prefix (CP) can then be added using 510 to arrive at the random access signal 513. The random access signal 513 is transmitted over the air.

Figure 6:
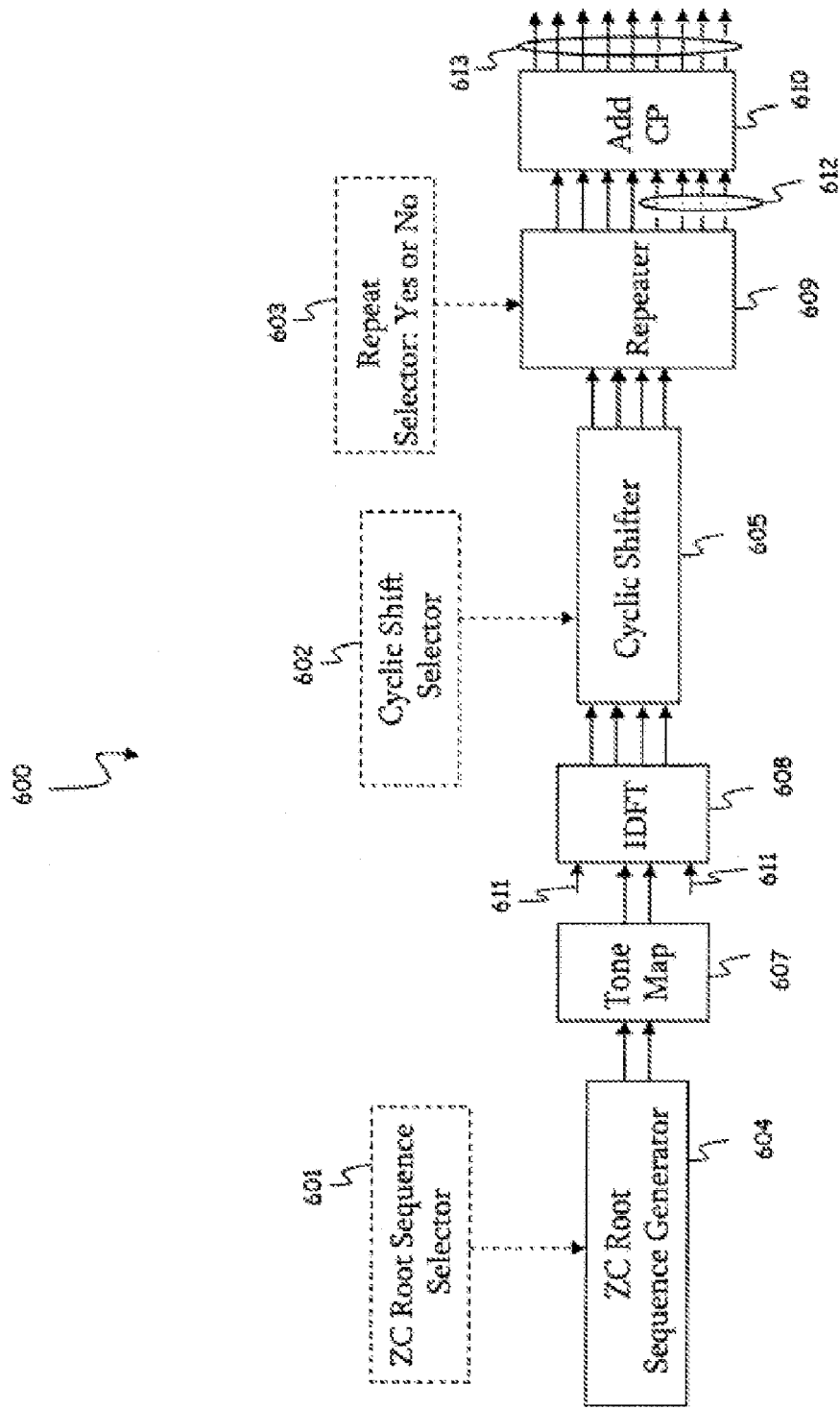
FIG. 6 shows a third illustrative embodiment of a random access signal transmitter.

FIG. 6 is a block diagram showing an apparatus in accordance with a third embodiment of the present disclosure.

Apparatus 600 comprises ZC Root Sequence Selector 601, Cyclic Shift Selector 602, Repeat Selector 603, ZC Root Sequence Generator 604, Cyclic Shifter 605, Tone Map 607, other signals or zero-padding in 611, IDFT in 608, Repeater in 609, optional repeated samples 612, Add CP in 610, and the random access signal in 613. Elements of the apparatus may be implemented as components in a fixed or programmable processor. In some embodiments, the IDFT block in 608 may be implemented using an Inverse Fast Fourier Transform (IFFT). Apparatus is 600 used to select and perform the random access preamble signal transmission as follows. The UE performs selection of the ZC CAZAC root sequence using ZC Root Sequence Selector 601 and the selection of the cyclic shift value using Cyclic Shift Selector 602. Then, UE generates the ZC sequence using ZC Root Sequence Generator 604. The selected ZC sequence is mapped onto a designated set of tones (sub-carriers) using Tone Map 607. Additional signals or zero-padding 611, may or may not be present. The UE then performs IDFT of the mapped signal using 608. Using Cyclic Shifter 605, the selected value of the cyclic shift is applied to the IDFT-ed signal. The value of the cyclic shift is obtained from the Cyclic Shift Selector 602. Block-Repetition of the cyclically shifted IDFT-ed signal is optional, and performed using 609. Note that 612 represents optional repeated samples. This repetition can be applied when the preamble transmission occupies two or more sub-frames. An optional cyclic prefix (CP) can then be added using 610, to arrive at the random access signal 613. The random access signal 613 is then transmitted over the air.

In various embodiments of the present disclosure, the set of allowed cyclic shifts can be dimensioned in accordance with the physical limitations of the cell, which include cells maximum round trip delay plus the delay spread of the channel. For example, a single root ZC CAZAC sequence may be cyclically shifted by any integer multiple of the cell's maximum round trip delay plus the delay spread, to generate a set of pre-defined random access preamble signals. The maximum round trip delay plus the delay spread of the channel calls for conversion to the sampling unit of the sequence. Thus, if the maximum round trip plus the delay spread of the channel is given as "x," then possible choices for cyclic shift values can be dimensioned as n from $\{0, x, 2x, \ldots, (u-1)x\}$ where ux can't exceed the length of the sequence which is being cyclically shifted.

Round trip delay is a function of cell size, where cell size is defined as the maximum distance d at which a UE can interact with the cell's base station, and can be approximated using the formula $t=6.67d$, where t and d are expressed in μs and km respectively. The round-trip delay is the delay of the earlier radio path. A typical earlier path is the line-of-sight path, defined as the direct (straight-line) radio path between the UE and the base station. When the UE is surrounded by reflectors, its radiated emission is reflected by these obstacles, creating multiple, longer traveling radio paths. Consequently, multiple time-delayed copies of the UE transmission arrive at the base station. The time period over which these copies are delayed is referred to as "delay spread," and for example, in some cases, 5 μs may be considered a conservative value thereof.

When the set $\{0, x, 2x, \ldots, (u-1)x\}$ of cyclic shifts generates an insufficient number of distinct random access preamble signals, then additional root CAZAC sequences (for example, for M=2 and M=3) can be employed for random access preamble signal generation. In this situation, selection of prime N proves to be advantageous, because with N prime, the set of possible choices for M is $\{1, 2, \ldots, (N-1)\}$. Thus, in one embodiment of the present disclosure, distinct random access preamble signals are identified by the set of possible choices for the cyclic shift value and the set of allowed choices for M. In addition to providing supplementary intra-cell sequences, when used in neighboring cells, these additional root ZC CAZAC sequences provide good inter-cell interference mitigation. Thus, during the cellular system design, a scenario where adjacent cells use identical root sequences should be avoided. This can be achieved through a number of possible techniques, including but not limited to: cellular system planning, sequence hopping, or a combination thereof.

The set of allowed random access preamble signals is made known to the UE prior to the random access transmission. This can be achieved in a number of different ways, including hard-wiring this information in the UE. The preferred approach, however, is for the Node B to broadcast information which allows the UE to infer the set of allowed random access preamble signals. For example, the Node B can broadcast: 1) which root CAZAC sequences are permitted, and 2) which values of the "cyclic-shift" are permitted. The UE reads the broadcasted information, infers the allowed set of random access preamble signals, selects at least one signal from the set, and performs the random access transmission. Note that the selection of the random access preamble signal amounts to the selection of the root ZC CAZAC sequence, the selection of the value of the cyclic shift, and possibly the selection of the frequency bin (in case multiple bins are configured per random access time slot). In certain cases, additional broadcasted information may be added, such as whether or not the UE needs to perform signal repetition. Overall, this approach, based on broadcasting the added information, is preferred, in that the approach allows for optimizing the cellular network based on physical limitations, such as the cell-size. Any given UE is then flexible enough to be used in all types of cells, and system optimization is performed by the cell design.

Sequences obtained from cyclic shifts of a single CAZAC root sequence (ZC or otherwise) are orthogonal to one another if the cyclic shift value is larger than the maximum time uncertainty of the received signal, including the delay spread and the spill-over. In other words, the cyclic shifts create zones with zero correlation between distinct random access preamble signals. Thus, a cyclically shifted sequence can be observed without any interference from sequences created using different cyclic shifts. Sequences obtained from cyclic shifts of different Zadoff-Chu (ZC) sequences are not orthogonal, but have optimal cross-correlation as long as the sequence length is a prime number. Therefore, in various embodiments, orthogonal sequences are preferred over non-orthogonal sequences. For this reason, additional Zadoff-Chu (ZC) root sequences may be used when the required number of sequences cannot be generated by cyclic shifts of a single root sequence. As a result, cyclic shift dimensioning is of primary importance in the random access sequence design. As mentioned above, the cyclic shift value is dimensioned to account for the maximum time uncertainty in random access preamble reception. This time uncertainty reflects the Node B-UE-Node B signal propagation delay ("round-trip time") plus the delay spread. Thus, cyclic shift dimensioning ensures that distinct random access signals, generated from a single root CAZAC sequence, are received within the zone of zero mutual correlation. Although delay spread can be assumed to be constant, signal round-trip time depends on the cell size. Thus, the larger the cell, the larger the cyclic shift used to generate orthogonal sequences, and correspondingly, the larger the number of Zadoff-Chu (ZC) root sequences used to provide the required number of sequences.

Table 1 provides an example of random access preamble sequence design for different cell sizes. Table 1 illustrates how the number of root ZC CAZAC sequences increases from 1 to 8, when the cell size is increased from 0.8 km (Cell Scenario 1) to 14 km (Cell Scenario 4). Table 1 is derived using following parameters: Maximum delay spread is 5 μsec, root ZC CAZAC sequence length is 863 samples, preamble sampling rate is 1.07875 MHz, and spill-over guard period is 2 samples. Because the expected inter-cell interference and load (user density) increases as cell size decreases, smaller cells call for more protection from co-preamble interference than larger cells. Thus, the relationship between cell size and the required number of Zadoff-Chu (ZC) root sequences allows for system optimization, and the Node B should configure the primitive cyclic shift to be used in each cell independently. The set of cyclic shifts values to be used is then built as integral multiples of the primitive cyclic shift value. As shown in Table 1, the system can be optimized either by configuring the primitive cyclic shift value, or by configuring the number of different root Zadoff-Chu (ZC) sequences to be used in a cell. This configurability advantageously provides a constant number of distinct random access preamble signals irrespective of the cell size, which simplifies the specification of the Medium Access Control (MAC) procedure.

TABLE 1

Cell Scenarios With Respect to Different Cyclic Shift Increments

| Cellular Scenario Index | Cell Size [km] | Number of Distinct Random Access Preamble Signals | Number Of Used Root ZC CAZAC Sequences | Number of Used Cyclic Shifts Per ZC Sequence | Primitive Cyclic Shift Value [samples] |
|---|---|---|---|---|---|
| 1 | 0.8 | 64 | 1 | 64 | 13 |
| 2 | 2.6 | 64 | 2 | 32 | 26 |
| 3 | 6.3 | 64 | 4 | 16 | 53 |
| 4 | 13.9 | 64 | 8 | 8 | 107 |

Figure 7:
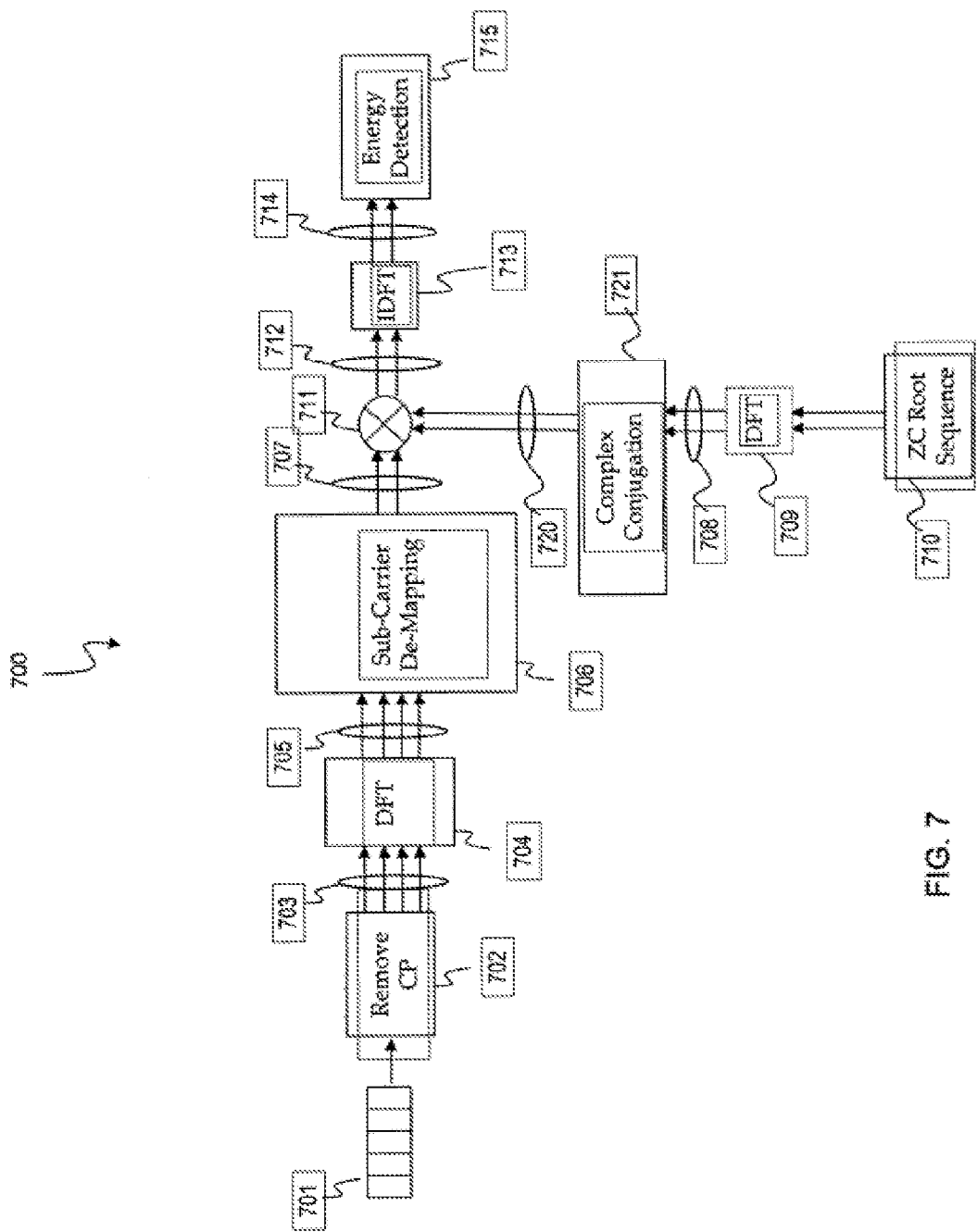
FIG. 7 shows an illustrative non-synchronous random access signal receiver.

FIG. 7 shows an embodiment of a random access signal receiver. This receiver advantageously makes use of the time and frequency domain transforming components used to map and de-map data blocks in the up-link sub-frame. The received random access signal 701; comprising cyclic prefix and random access preamble signal, is input to cyclic prefix removal component 702 which strips cyclic prefix from the random access signal producing signal 703. Frequency domain transforming component DFT 704 couples to cyclic prefix removal component 702. Frequency domain transforming component 704 converts signal 703 into sub-carrier mapped frequency tones 705. Sub-carrier de-mapping component 706 is coupled to frequency domain transforming component 704. Sub-carrier de-mapping component 706 de-maps sub-carrier mapped frequency tones 705 to produce useful frequency tones 707. Product component 711 is coupled to both sub-carrier de-mapping component 707 and frequency domain transforming component 709. Frequency domain transforming component (DFT) 709 converts a preamble root sequence 710, such as a prime length Zadoff-Chu sequence, into a corresponding set of pilot frequency tones 708. Complex conjugation of pilot frequency tones 708 is performed using 721, to produce samples 720. Product component 711 computes a tone by tone complex multiplication of received frequency tones 707 with samples 720 to produce a set of frequency tones 712. Time domain transforming component (IDFT) 713 is coupled to product component 711. Time domain transforming component 713 converts multiplied frequency tones 712 into correlated time signal 714. Correlated time signal 714 contains concatenated power delay profiles of the cyclic shift replicas of the preamble root sequence 710. Energy detection block 715 is coupled to time domain transforming block 713. Energy detection block 715 identifies received preamble sequences by detecting the time of peak correlation between received random access signal 701 and preamble root sequence 710. Note that frequency domain transforming component 709 is called for when using the transmitters illustrated in FIG. 4, or FIG. 5. When using the transmitter of FIG. 6, frequency domain transforming component 709 may be omitted.

As disclosed, a prime length preamble sequence is recommended for use with the up-link transmitter system. A prime length preamble sequence may be constructed as follows. Preamble duration $T_p$ is selected to optimize cell coverage (cell size, noise and interference conditions), and to be an integer multiple of the up-link data block duration. A reference length $N_{pi}=T_p \times R_{si}$ samples is selected, where $R_{si}$ is the allocated random access signal bandwidth, which is not used by data transmissions. A preamble sequence is then generated with sequence length corresponding to the largest prime number $N_p$ which is less than reference length $N_{pi}$. Thus, since preamble duration remains $T_p$, preamble sampling rate becomes $R_{si} \times N_p/N_{pi}$. Because $N_{pi}$ sub-carriers are allocated to the random access channel, and the preamble was shortened to the nearest lower prime number of samples ($N_p$), there are unused sub-carriers that may be zeroed and distributed outside the preamble sub-carriers to isolate the preamble from the surrounding frequency bands.

Figure 8:
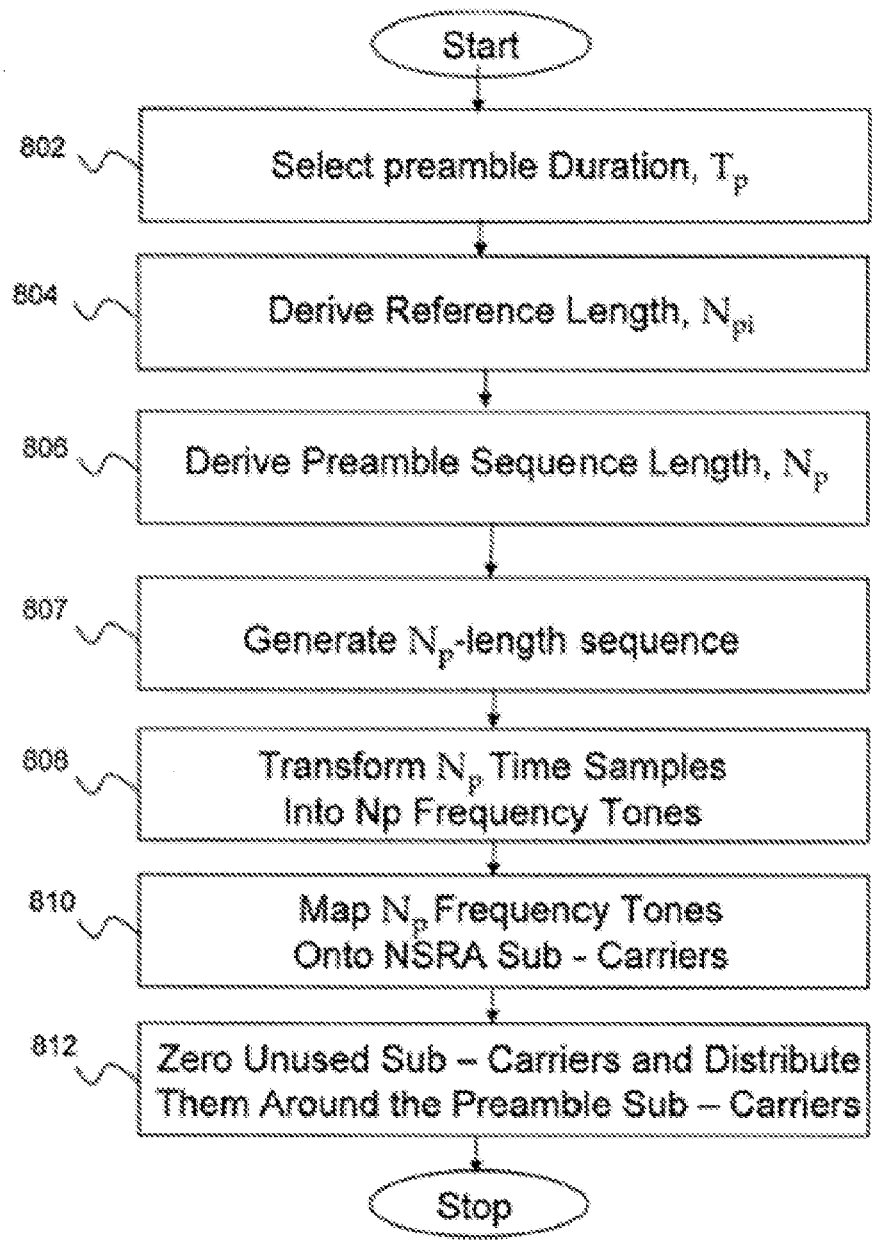
FIG. 8 shows a flow diagram of an illustrative random access preamble signal length adjustment and transmission method.

FIG. 8 shows a flow diagram of an illustrative method for adapting a prime length sequence for use with an up-link transmitter. In 802, a preamble duration $T_p$ is selected. $T_p$ is an integer multiple of the up-link sub-frame data block duration. In 804, a reference length is derived. This reference length is $N_{pi}$ samples, where $N_{pi}=T_p \times R_{si}$, and $R_{si}$ is the random access signal bandwidth. In 806, the reference length derived in 804 is shortened to the nearest lower prime number of samples, $N_p$, to derive the preamble sequence length. In 807, the $N_p$-length sequence is generated. In 808, the $N_p$ time samples are converted into $N_p$ frequency tones. The $N_p$ frequency tones are mapped onto the allocated random access channel sub-carriers in 810. Because $N_{pi}$ sub-carriers are allocated to the random access channel, and the preamble sequence length was shortened to $N_p$ samples resulting in only $N_p$ frequency tones to be mapped onto the sub-carriers, $N_{pi}-N_p$ sub-carriers remain unused. In 812, the unused sub-carriers are zeroed and distributed around the preamble sub-carriers to provide isolation from adjacent frequency bands. These unused sub-carriers can be potentially re-used for cubic metric reduction through either cyclic extension or tone reservation.

Figure 9:
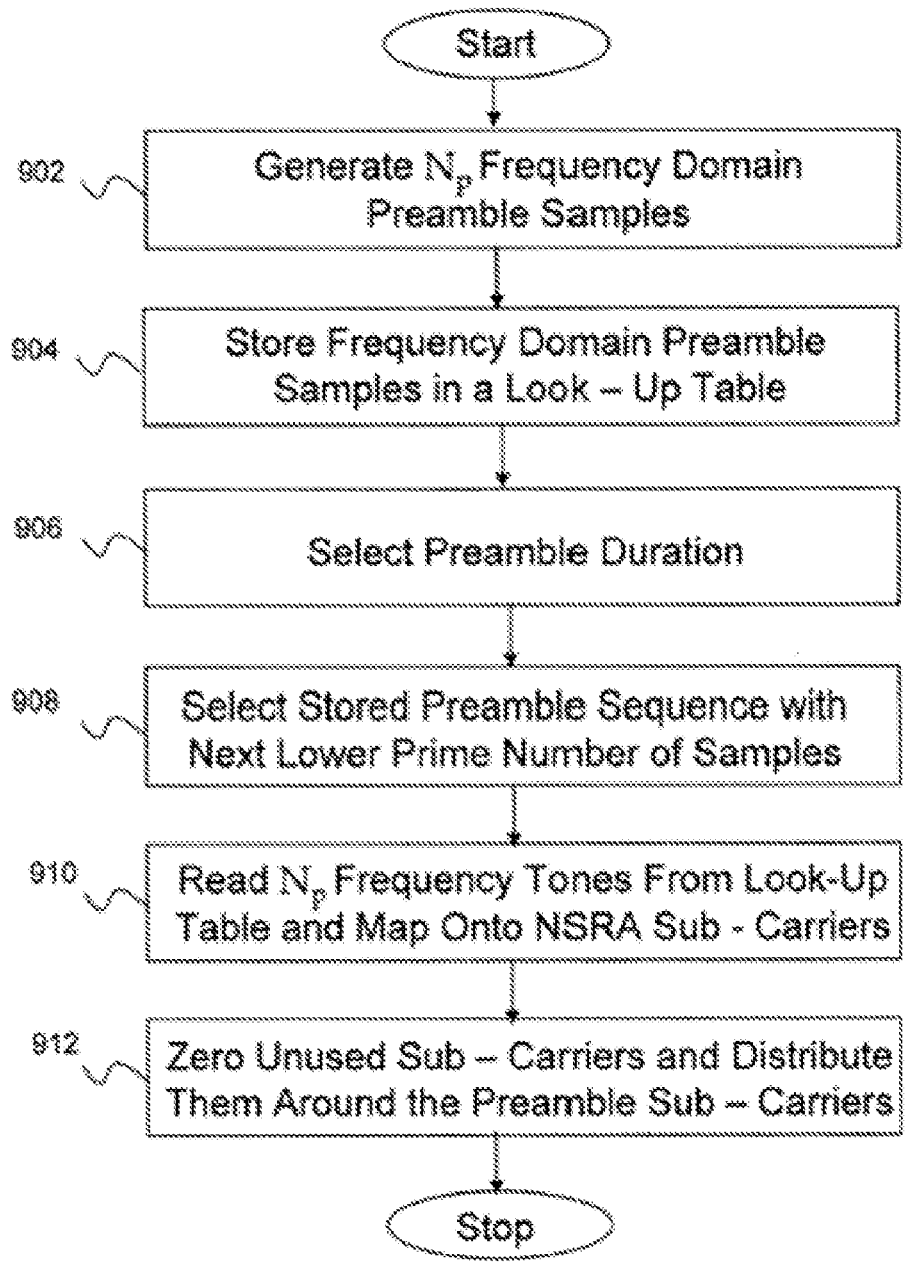
FIG. 9 shows a flow diagram of an illustrative alternative random access preamble signal length adjustment and transmission method.

FIG. 9 shows a flow diagram of an alternative method of generating a prime length sequence for use with an up-link transmitter. Because the preamble sequence is deterministic, prime length preamble sequences can be predefined and stored for later use. In 902, once configured by the Node B, the prime length preamble sequences are generated and converted into frequency domain preamble samples. In 904, the frequency domain preamble samples are stored in a storage device to be retrieved as needed. In 906, a random access signal transmission is initiated, and a preamble duration is selected. The selected duration is an integer multiple of up-link sub-carrier data block duration, and is chosen to meet system coverage needs. In 908, a stored preamble sequence is selected. The selected sequence preferably is the sequence having the prime number of samples immediately lower than the number of samples computed from the duration selected in 906 and random access signal bandwidth. In 910, the preamble frequency samples are read from the storage device and mapped onto the sub-carriers allocated to the random access channel. Because more sub-carriers are allocated to the random access channel than there are preamble frequency samples, unused sub-carriers are zeroed and distributed around the preamble sub-carriers to provide isolation from adjacent frequency bands. This alternate implementation allows omission of the frequency domain transforming component 402 from the random access preamble transmitter. The preamble samples are frequency domain transformed only once, prior to storage, and therefore the transform process is not concerned with the latency requirements of the random access preamble transmitter, and can be implemented in a simpler and less costly manner. It should be further noted that frequency domain transforming component 406 can be totally eliminated if the preamble root sequence is configured directly in frequency representation by the Node B. However, because the preamble sequence is defined to be a Cyclic Shifted Zadoff-Chu sequence, the cyclic shift is implemented. The cyclic shift may be performed at the system sampling rate before cyclic prefix insertion 410.

Figure 14:
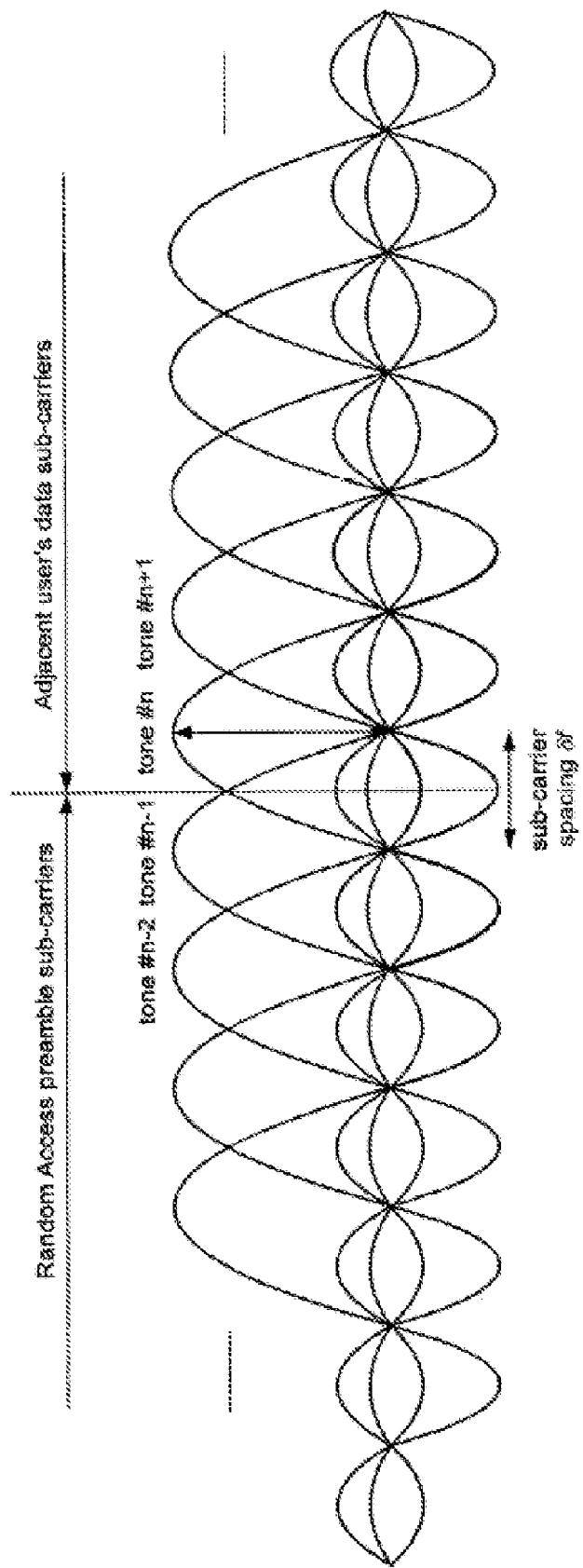
FIG. 14 illustrates the orthogonality principle employed in Orthogonal Frequency Division Multiplexed systems.
Figure 15:
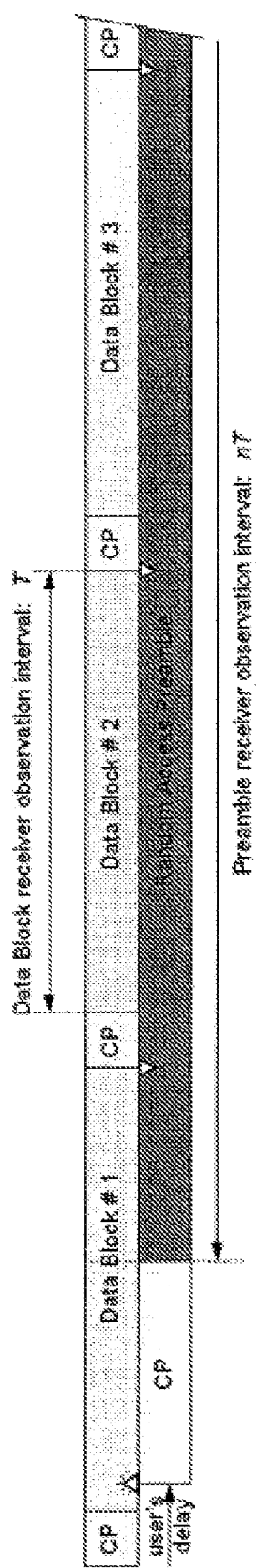
FIG. 15 shows the misalignment between random access preamble signal and scheduled data OFDM symbols.

FIG. 14 illustrates the principle of orthogonal multiplexing in Orthogonal Frequency Division Multiplexed ("OFDM") systems. Each tone carries a modulated symbol according to a frequency overlapped time limited orthogonal structure. The frequency tones overlap with each other so that in the center of a tone, the spectral envelopes of the surrounding tones are null. This principle allows multiplexing of different transmissions in the same system bandwidth in an orthogonal manner. However, this only holds true if the sub-carrier spacing δf is kept constant. δf is equal to the inverse of the OFDM symbol duration T, used to generate the frequency tones by DFT. Because the preamble OFDM symbol is longer than the data OFDM symbol, the sub-carrier spacing of the preamble OFDM symbol will be shorter than the sub-carrier spacing of the data OFDM symbol. In addition, since data and preamble OFDM symbols are neither aligned nor have the same durations (FIG. 15), strict orthogonality cannot be achieved. However, the following design rules are directed towards minimizing the co-interference between preamble and data OFDM symbols. First, fixing the preamble OFDM symbol duration to an integer multiple of the data symbol duration provides some commensurability between preamble and data sub-carriers, thus reducing interference these sub-carriers. Second, the preamble sampling frequency should be an integer multiple of the data symbol sub-carrier spacing.

In OFDM systems, different UEs' transmissions are dynamically allocated to different non overlapping frequency bands. This allocation is generally based on a minimum frequency granularity, called a resource block (RB). In order to facilitate the frequency multiplexing of the random access preamble and the data transmission, the preamble preferably is allocated a integer number of resource blocks.

In addition to the detection process, random access preamble signal 304 allows base station 101 to analyze the frequency response of up-link 111, over a range of frequencies within the preamble bandwidth. Characterization of up-link 111 frequency response allows base station 101 to tailor the narrow band up-link 111 resources allocated to UE 109 within the preamble bandwidth to match up-link 111 frequency response, resulting in more efficient utilization of up-link resource.

Figure 16:
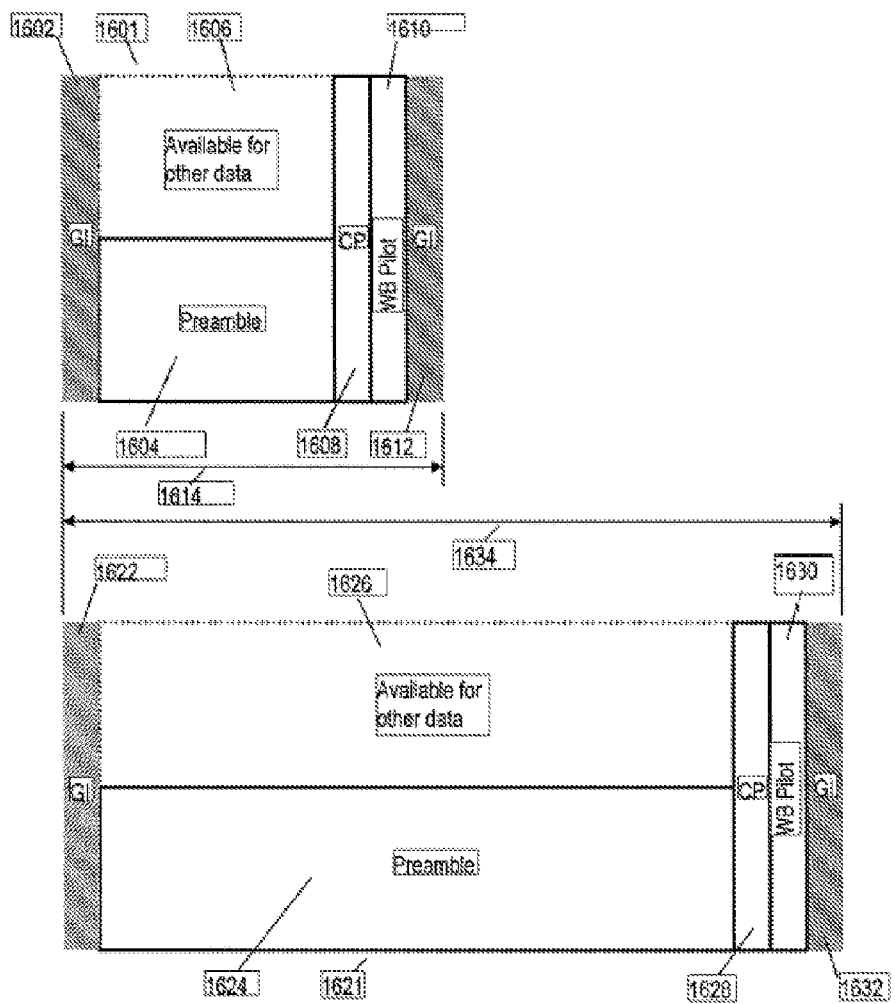
FIG. 16 shows alternative illustrative 1 and 2 sub-frame random access signals.

FIG. 16 shows an alternate embodiment of a random access signal, designed to address the situation in which the ratio between the random access preamble signal bandwidth and the first post-preamble up-link transmission is too small to adequately benefit from sounding the channel using only the random access preamble signal itself. Both a one sub-frame random access signal 1601 and a two sub-frame random access signal 1621 are illustrated. The addition of wide-band pilot signal 1610 to random access signal 1601 allows base station 101 to analyze the frequency response of up-link 111 over a wider range of frequencies than would be possible with the random access preamble signal alone.

In the illustrated embodiment, cyclic prefix 1608 follows random access preamble signal 1604. Cyclic prefix 1608 comprises a guard interval designed to eliminate interference between random access preamble signal 1604 and wide-band pilot signal 1610.

Guard interval 1612 follows wide-band pilot signal 1610 to prevent interference between wide-band pilot signal 1610 and any transmission in the subsequent sub-frame on the same transmission frequencies used by wide-band pilot signal 1610.

Random access signal 1621, occupies two sub-frames 1634. Random access signal 1621 is structurally similar to random access signal 1601, however, random access preamble signal 1624 is extended to occupy most of two sub-frames. Such extension can be accomplished either by repeating one sub-frame random access preamble signal 1604, or by extending the CAZAC sequence. Guard interval 1622 precedes random access preamble signal 1624, and cyclic prefix 1628. Wide-band pilot signal 1630 and guard interval 1632 follow random access preamble signal 1624 to complete two sub-frame random access signal 1621.

Referring again to FIG. 3, guard interval 306 follows random access preamble signal 304 to prevent interference between random access preamble signal 304 and any transmission in the subsequent sub-frame on the same transmission frequencies used by random access preamble signal 304.

In FIG. 3, two sub-frame random access signal 311 begins with guard interval 312, which may comprise a cyclic prefix, to prevent inter-symbol interference between subsequent random access preamble signal 314 and any transmission in the previous sub-frame. Random access preamble signal 314 is extended into the second sub-frame. Such extension may be effectuated by concatenating multiple copies of one sub-frame random access preamble signal 304, or by generating random access preamble signal 314 as an extended CAZAC sequence, keeping the number of orthogonal CAZAC sequences obtained by cyclically shifting the root CAZAC sequence in an approximately constant manner. While a two sub-frame random access signal is illustrated, random access signals comprising any number of sub-frames necessary to accommodate a specific cell size, and noise, interference condition can be similarly constructed. In the embodiment illustrated in FIG. 3, guard interval 318 follows random access preamble signal 314 to complete two sub-frame random access signal 311.

Figure 10:
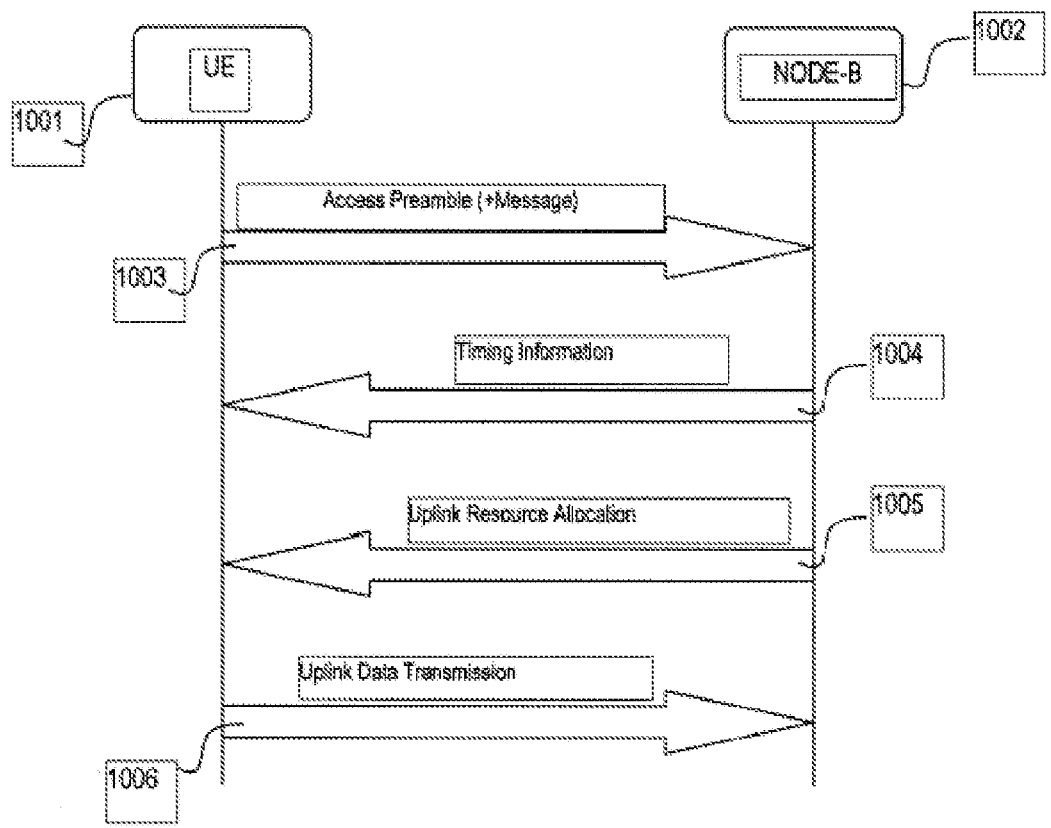
FIG. 10 shows an illustrative conventional random access procedure signal flow diagram.
Figure 11:
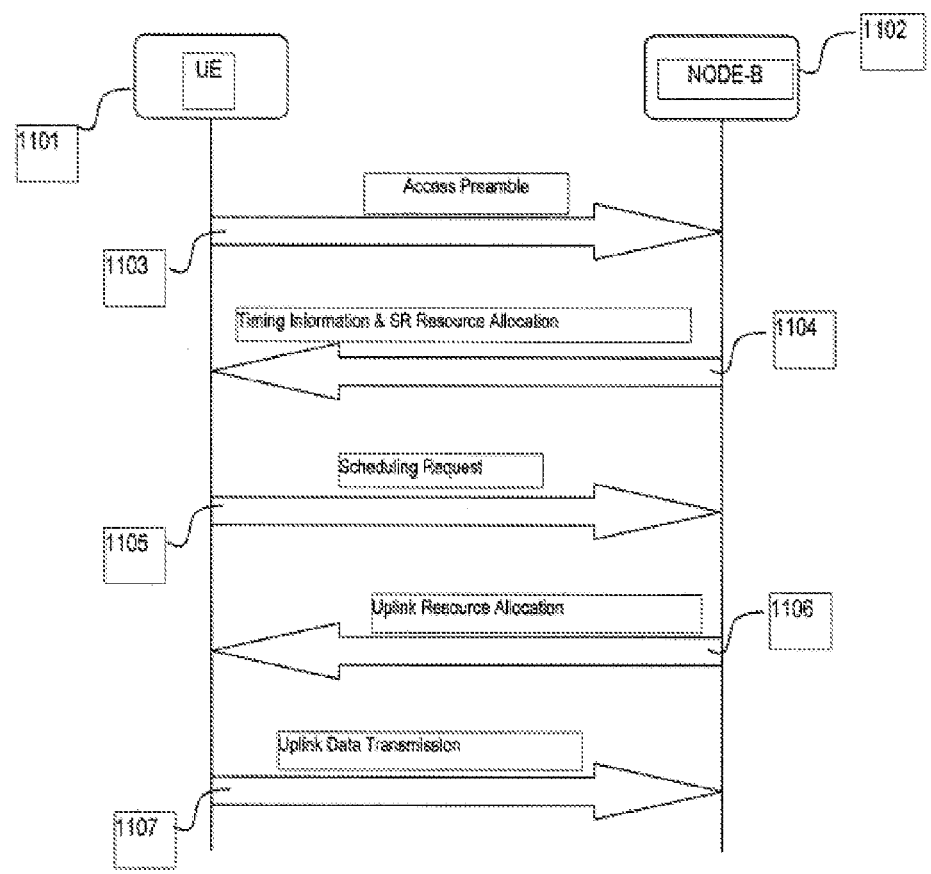
FIG. 11 shows an alternative illustrative conventional random access procedure signal flow diagram.

In some embodiments, it is desirable to transfer some information as part of the random access procedure to facilitate the base-station's scheduling of subsequent UE transmissions. Random access cause, UE identifier, capacity requested, and down-link radio link quality indicator (e.g. channel quality indicator "DL CQI" or path loss) are examples of information potentially valuable to the base station if included in the random access procedure. FIG. 10 and FIG. 11 illustrate two conventional approaches to transferring data during a random access. In FIG. 10, UE 1001 transmits random access signal 1003. Random access signal 1003 is extended to include information useful to the Node B 1002. Node B 1002 responds with timing information 1004 to adjust the up-link timing of UE 1001, and an up-link resource allocation 1005 that UE 1001 will use for subsequent uplink data transmission 1006.

In FIG. 11, UE 1101 transmits a random access signal 1103 without additional information. Node B 1102 responds with timing information and an up-link resource allocation 1104 to be used by the subsequent scheduling request 1105. UE 1101 transmits scheduling request 1105 using the allocated up-link resource, and Node B 1102 responds by transmitting an up-link resource allocation 1106. UE 1101 uses the allocated up-link resource for subsequent up-link data transmission 1107.

The procedure of FIG. 10 exhibits lower latency than the procedure of FIG. 11. However, in order to achieve an acceptable error rate, the information message included in burst 1003 may be several times longer than the preamble. Accordingly, the procedure of FIG. 10 results in higher overhead than the procedure of FIG. 11. Finally, when the higher efficiency of the scheduled channel relative to the contention channel is considered, the procedure of FIG. 11 may be preferable.

Figure 12:
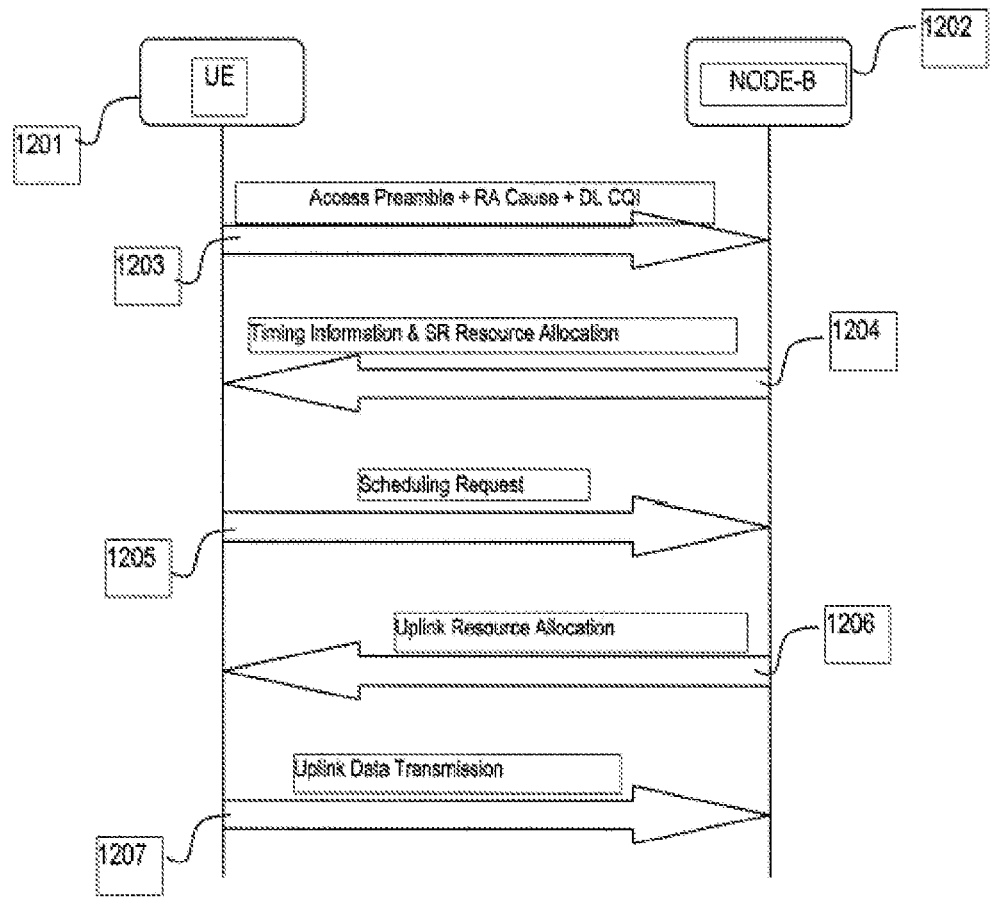
FIG. 12 shows an illustrative hybrid random access procedure signal flow diagram.

FIG. 12 illustrates a novel embodiment of a random access procedure in which UE 1201 transmits a random access signal implicitly containing information relevant to Node B 1201 decision making. The information of 1201 is not explicitly conveyed as in the procedure of FIG. 10, but is encoded by selection of, for example, preamble sequence and transmission band. If, for example, UE 1201 encodes a 3 bit random access cause, a 2 bit DL CQI, and 1 random bit in the random access signal, this information might be encoded in any $2^6$ unique combinations of random access preamble signals. Additional combinations can be provided by allocating multiple frequency bands 201 to random access. When Node B 1202 receives random access signal 1203, it employs the encoded information to, for example, determine the response to a resource request. The determined response may be based on down link channel quality, urgency of resource request, predefined up-link allocation based on random access cause, or other relevant criteria. Node B 1202 responds, if appropriate, to random access signal 1203 with timing information and a scheduling request resource allocation 1204. UE 1201 transmits scheduling request 1205 using the transmission resource allocated in message 1204. On receipt of scheduling request 1205, Node B 1202 transmits uplink resource allocation 1206, and UE 1201 makes subsequent data transmission 1207 via the allocated resource. In a further embodiment, the procedure of FIG. 10 is employed, but with information encoded by selection of random access signal parameters, such as random access preamble signal or frequency band, as previously disclosed in this paragraph, thus avoiding the inefficiencies of the procedure of FIG. 10, and taking advantage of the reduced latency of the procedure of FIG. 10.

Encoding random access cause in the random access signal enables the implementation of selective access restrictions based on the cause of the random access. For example, in a highly loaded cell, the Node B may accept UE's random access attempts related to handover or emergency calls, but reject random access attempts for initial access. This example illustrates a hard restriction, in which new users are rejected based on cell loading. However soft restrictions, allowing acceptance of new users based on link quality are also possible. Enabling selective access restrictions based on random access cause encoded in the random access signal allows implementation of fast and efficient load balancing at the physical layer, reducing the latency associated with load balancing implemented at higher layers.

In order to support load balancing in accordance with the present disclosure, the random access procedure supports the following features: 1) the random access signal includes the random access cause, and 2) the Node B is adapted to refuse a UE's request through a non-acknowledgment (NACK) in the random access response.

As a further refinement of the disclosed implicit information encoding method, the $2^6$ combinations of random access preamble signals ("signatures"), used to encode information may be subdivided into groups of signatures serving uses having similar response priority or latency requirements. In one embodiment, the 64 available signatures might be divided into 6 groups ("access types"). The access types may be, for example, handover type 1, high priority UE connection, handover type 2, normal priority UE connection, out of sync recovery with up-link allocation request, and timing advance maintenance without up-link allocation request. Each access type represents a different access priority or urgency, and accordingly a corresponding latency requirement. Each access type may employ a different number of signatures, and access types requiring lower latency may be assigned a larger number of signatures. The number of signatures allocated to each access type may be dynamically configured within each cell to optimize access type signature diversity based on, for example, cell load.

Additional information, for example DL CQI, may be encoded within the signatures of an access type by selecting subgroups of signatures to represent the information values. For example, if 16 signatures are allocated to handover type 1, those signatures may be divided into two subgroups of 8 signatures each, each subgroup representing one state of one information bit.

In another embodiment, the 64 available signatures might be partitioned into 2 cause groups: the urgent causes (e.g., handover, new data to transmit in RRC_CONNECTED state) and non urgent causes (e.g., initial access, tracking area update). A fair partitioning would consist of allocating to each group a number of signatures corresponding to the respective load of each group. However, an unfair partitioning might also be used to favor the urgent causes (more signatures) over the non-urgent causes (less signatures). Moreover, the urgent causes might be further split into two sub-partitions to carry one bit, for example, radio link quality. The Node B takes advantage of this information when allocating the UL grant for the first UL transmission on the shared channel. Thus, a UE with an urgent cause in good radio link conditions can potentially send its complete random access request in one message, which further accelerates the procedure.

It is preferable to avoid collisions in the random access channel. Signature diversity is the principal means of avoiding collision. When collisions do occur, however, they call for resolution. Collisions may be resolved, for example, by a combination of back-off procedures and signature space randomness. As indicated above, access types requiring lower latency should be assigned a larger number of signatures to reduce the likelihood of collisions when signatures are randomly selected. Additionally, the expected load of each access type is a consideration when allocating signatures to each access type. For example, reordering the list of six access types identified above by decreasing load may result in: handover type 1, out of sync recovery with up-link allocation request, timing advance maintenance without up-link allocation request, handover type 2, high priority UE connection, and normal priority UE connection. An allocation of signatures considering both latency and load might result in signature allocation as follows: handover type 1-16 signatures, timing advance maintenance without up-link allocation request—16 signatures, out of sync recovery with up-link allocation request—12 signatures, high priority UE connection—8 signatures, handover type 2-8 signatures, and normal priority UE connection—4 signatures.

When an access type is applicable to both contention and non-contention access, the associated signatures may be partially allocated for randomness and partially allocated non-contention use.

Figure 13:
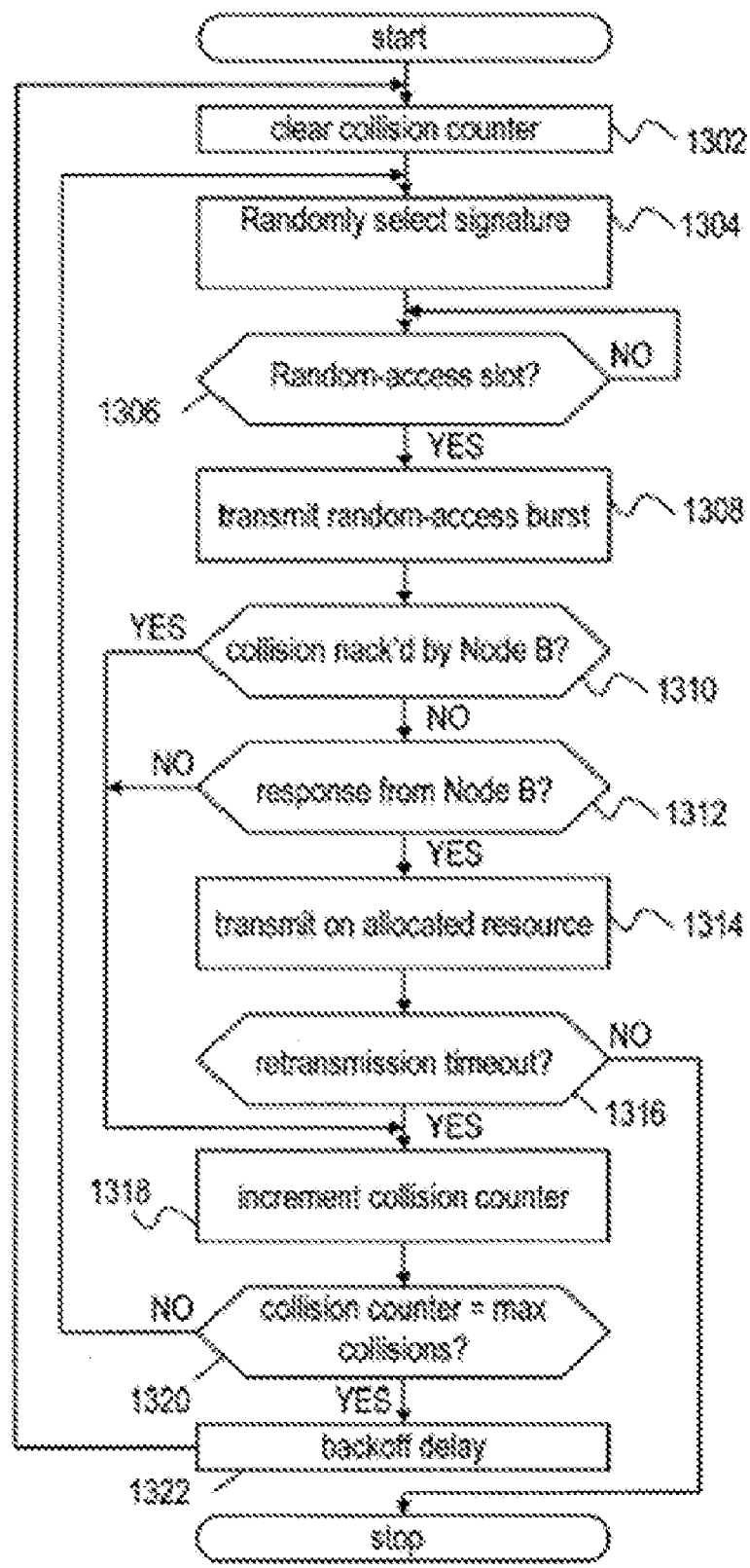
FIG. 13 shows a flow diagram of an illustrative random access collision handling method.

Because collision resolution through back-off procedures increases latency, back-off procedures should be employed only as necessary, and in combination with random signature selection. FIG. 13 is a flow diagram of an illustrative collision resolution method incorporating both back-off and randomness in the signature space. In 1302, the unscheduled transmission procedure begins by zeroing a counter holding the number of collisions detected. A signature is randomly selected from the pool of available signatures in 1304. In 1306, the next occurring random access time slot is identified, and the random access signal is transmitted in 1308. If Node B detects a collision and transmits a NACK to the UE in 1310, or due to collision, Node B is unable to detect the random access signal and no response is received by the UE in 1312, then the collision counter is incremented in 1318, and if fewer than a predefined maximum number of collisions have been registered in 1320, transmission is restarted with random signature selection in 1304.

If the random access signal transmitted in 1308 is not NACK'd by Node B in 1310 and a response including a resource allocation is received from Node B in 1312, then UE transmits its data on the allocated resource in 1314. If a collision occurred during the random access signal transmission of 1308, but Node B failed to detect the collision and transmitted a single resource allocation for use by multiple UEs, the UE transmissions of 1314 will collide. When this collision is detected by UE in 1316, the collision counter is incremented in 1318, and if fewer than a predefined maximum number of collisions have been registered in 1320, transmission is restarted with random signature selection in 1304.

If the predefined maximum number of collisions has been registered in 1320, the back-off procedure is initiated in 1322. The predefined maximum number of collisions may be different for each access type. The back-off delay may also vary for each access type. In one embodiment, the back-off delay is a function of the number of previously unsuccessful attempts (Nu) such that the first attempt after back-off occurs in the next random access time slot with probability $(2/3)^{Nu}$.

A first embodiment of the disclosed present disclosure comprises an apparatus for transmitting a random access signal comprising: a CAZAC root sequence selector coupled to a CAZAC root sequence generator, wherein the CAZAC root sequence generator generates at least one CAZAC root sequence, and wherein the CAZAC root sequence selector selects a preamble root sequence from the at least one CAZAC root sequences. Furthermore, the CAZAC root sequence generator is a Zadoff-Chu sequence generator. The apparatus may further comprise a sequence modifier for modifying the preamble root sequence coupled to the CAZAC root sequence generator, and a sequence modification selector for selecting a preamble root sequence modification coupled to the sequence modifier. Furthermore, the sequence modifier is a cyclic shifter. The apparatus may further comprise a frequency transformer for transforming a modified preamble sequence into frequency tones coupled to the sequence modifier. The apparatus may further comprise a tone mapper for mapping frequency transformer output onto sub-carriers coupled to the frequency transformer. The apparatus may further comprise an inverse frequency transformer for transforming output of the tone mapper coupled to the tone mapper. The apparatus may further comprise a block repeater for replicating output of the inverse frequency transformer coupled to the inverse frequency transformer, and a block repeat selector for selecting block replication coupled to the block repeater. The apparatus may further comprise a cyclic prefix inserter for adding cyclic prefix to block repeater output coupled to the block repeater.

A second embodiment of the disclosed present disclosure comprises an apparatus for transmitting a random access signal comprising: a CAZAC root sequence selector coupled to a CAZAC root sequence generator, wherein the CAZAC root sequence generator generates at least one CAZAC root sequence, and wherein the CAZAC root sequence selector selects a preamble root sequence from the at least one CAZAC root sequences. The apparatus may further comprise a tone mapper for mapping the preamble root sequence onto sub-carriers coupled to the CAZAC root generator. The apparatus may further comprise an inverse frequency transformer for transforming the output of the tone mapper coupled to the tone mapper. The apparatus may further comprise a sequence modifier for modifying the inverse frequency transformer output coupled to the inverse frequency transformer, and a sequence modification selector for selecting a sequence modification coupled to the sequence modifier. Furthermore, the sequence modifier may comprise a cyclic shifter. The apparatus may further comprise a block repeater for replicating the output of the sequence modifier coupled to the sequence modifier, and a block repeat selector for selecting block replication coupled to the block repeater. The apparatus may further comprise a cyclic prefix inserter for adding cyclic prefix to the block repeater output coupled to the block repeater.

A third embodiment of the disclosed present disclosure comprises an apparatus for transmitting a random access signal comprising: a CAZAC root sequence selector coupled to a CAZAC root sequence generator, wherein the CAZAC root sequence generator generates at least one CAZAC root sequence, and wherein the CAZAC root sequence selector selects a preamble root sequence from the at least one CAZAC root sequences. The apparatus may further comprise a frequency transformer for transforming a modified preamble sequence into frequency tones coupled to the sequence modifier. The apparatus may further comprise a tone mapper for mapping the preamble root sequence onto sub-carriers coupled to the CAZAC root generator. The apparatus may further comprise an inverse frequency transformer for transforming the output of the tone mapper coupled to the tone mapper. The apparatus may further comprise a sequence modifier for modifying the inverse frequency transformer output coupled to the inverse frequency transformer, and a sequence modification selector for selecting a sequence modification coupled to the sequence modifier. Furthermore, the sequence modifier may comprise a cyclic shifter. The apparatus may further comprise a block repeater for replicating the output of the sequence modifier coupled to the sequence modifier, and a block repeat selector for selecting block replication coupled to the block repeater. The apparatus may further comprise a cyclic prefix inserter for adding cyclic prefix to the block repeater output coupled to the block repeater.

In another aspect, an embodiment of the disclosed present disclosure comprises an apparatus for receiving a random access signal comprising: a frequency transformer for transforming a root CAZAC sequence into pilot tones coupled to a complex multiplier. The apparatus may further comprise a sub-carrier de-mapping component for de-mapping sub-carrier mapped frequency tones coupled to the complex multiplier. The apparatus may further comprise a frequency transformer for transforming random access signal into sub-carrier mapped frequency tones coupled to the sub-carrier demapper. The apparatus may further comprise a cyclic prefix remover for removing cyclic prefix from a random access signal coupled to the frequency transformer. The apparatus may further comprise an inverse frequency transformer for transforming complex multiplier output into time signal coupled to the complex multiplier. The apparatus may further comprise an energy detector for detecting the peak correlation between the random access signal and the root CAZAC sequence coupled to the inverse frequency transformer.

A first method of the disclosed present disclosure comprises a method of accessing a wireless network comprising: transmitting a signal; said signal comprising a CAZAC sequence selected from a plurality of CAZAC sequences. The method may further comprise a prime length Zadoff-Chu sequence. Furthermore, the duration of said signal is determined independently for each network cell. An integer number of resource blocks are allocated for transmission of said signal, and said signal duration is an integer number of data symbols. The plurality of CAZAC sequences is subdivided into groups comprising a non-contention use group and a contention use group. The plurality of CAZAC sequences comprise CAZAC sequences created by applying modifications to at least one root CAZAC sequence. The modifications applied to the at least one root CAZAC sequence comprise cyclic shifts. The cyclic shifts applied to the at least one root CAZAC sequence are integer multiples of the (maximum cell round trip delay+delay spread) of the telecommunications network cell. The method may further comprise determining the cyclic shifts applied to the at least one root CAZAC sequence independently for each telecommunication network cell. The method may further comprise analyzing said signal to estimate the frequency response of the up-link transmission channel, and allocating up-link resources based on said frequency response estimation. The method may further comprise analyzing the random access preamble signal to estimate the frequency response the up-link. The method may further comprise allocating up-link resources based on the estimated frequency response of the up-link. The method may further comprise transmitting at least one wide band pilot signal. The method may further comprise analyzing the wideband pilot signal to estimate the frequency response of the up-link. The method may further comprise allocating up-link resources based on the estimated frequency response of the up-link. The plurality of CAZAC sequences represents a plurality of information values. The information represented by the random access preamble signal comprises: one of at least a down-link channel quality indicator and a random access cause. The method may further comprise allocating transmission resources according to said random access cause. The method may further comprise balancing telecommunication network cell loading by selective access restriction according to said random access cause. The method may further comprise subdividing said plurality of CAZAC sequences into access type groups. The method may further comprise allocating said plurality of CAZAC sequences to access type groups according to the latency requirements of the access type. The method may further comprise randomly selecting the CAZAC sequence to be transmitted from the plurality of CAZAC sequences allocated to the access type. The method may further comprise subdividing the plurality of CAZAC sequences allocated to each access type into sub-groups wherein each sub-group represents an information value. The method may further comprise determining for each telecommunication network cell, the number of CAZAC sequences per access type group, and the subdivision of access type groups into information representative sub-groups.

A second method of the disclosed present disclosure comprises a method for adapting a random access preamble for up-link transmission comprising: computing a frequency domain CAZAC sequence; storing the frequency domain CAZAC sequence in a storage device; reading the frequency domain CAZAC sequence from the storage device; and mapping the frequency domain CAZAC sequence onto the sub-carriers allocated to the random access channel.

Further disclosed is a method of resolving random access signal collisions comprising: randomly selecting a random access preamble signal from a plurality of random access preamble signals; and delaying transmission of the random access signal.

While illustrative embodiments of this present disclosure have been shown and described, modifications thereof can be made by one skilled in the art without departing from the spirit or teaching of this present disclosure. The embodiments described herein are illustrative and are not limiting. Many variations and modifications of the system and apparatus are possible and are within the scope of the present disclosure. Accordingly, the scope of protection is not limited to the embodiments described herein, but is only limited by the claims which follow, the scope of which shall include all equivalents of the subject matter of the claims.

What is claimed is:

1. An apparatus for transmitting a random access signal comprising:
    a prime-length Zadoff-Chu root sequence selector coupled to a prime-length Zadoff-Chu root sequence generator, wherein the prime-length Zadoff-Chu root sequence generator generates more than one prime-length Zadoff-Chu root sequence, and wherein the prime-length Zadoff-Chu root sequence selector autonomously selects a preamble root sequence from one of the prime-length Zadoff-Chu root sequences;
    a cyclic shifter for autonomously modifying the preamble root sequence coupled to the prime-length Zadoff-Chu root sequence generator;
    a sequence modification selector for selecting a preamble root sequence modification coupled to the cyclic shifter;
    a signal generator coupled to the sequence modification selector, wherein the signal generator generates a signal $x(u)$ from the modified preamble root sequence; and
    an asynchronous transmitter, wherein the asynchronous transmitter transmits the signal $x(u)$ irrespective of the timing of the target remote receiver.

2. The apparatus of claim 1 further comprising:
a frequency transformer for transforming a modified prime-length preamble sequence into a prime number of frequency tones coupled to the sequence modifier.

3. The apparatus of claim 1 further comprising:
a frequency transformer for transforming a modified prime-length preamble sequence into a prime number of frequency tones coupled to the sequence modifier; and
a tone mapper for mapping a prime number of frequency tones onto a non-prime number of frequency tones coupled to the frequency transformer.

4. An apparatus for transmitting a random access signal comprising:
a constant amplitude zero auto correlation (CAZAC) root sequence selector coupled to a CAZAC root sequence generator, wherein the CAZAC root sequence generator generates more than one CAZAC root sequence, and wherein the CAZAC root sequence selector selects a preamble root sequence from one of the CAZAC root sequences;
a cyclic shifter for modifying the preamble root sequence coupled to the CAZAC root sequence generator;
a sequence modification selector for selecting a preamble root sequence modification coupled to the cyclic shifter;
a frequency transformer for transforming a modified prime-length preamble sequence into a prime number of frequency tones coupled to the sequence modifier; and
a tone mapper for mapping a prime number of frequency tones onto a non-prime number of frequency tones coupled to the frequency transformer.

5. The apparatus of claim 4 further comprising:
an inverse frequency transformer for transforming output of the tone mapper coupled to the tone mapper.

6. The apparatus of claim 5 further comprising:
a block repeater for replicating output of the inverse frequency transformer coupled to the inverse frequency transformer;
a block repeat selector for selecting block replication coupled to the block repeater; and
a cyclic prefix inserter for adding cyclic prefix to block repeater output coupled to the block repeater.

7. A method of accessing a wireless network comprising:
transmitting an asynchronous random access signal, said signal comprising a prime-length Zadoff-Chu sequence autonomously selected from a plurality of prime-length Zadoff-Chu sequences created by applying cyclic shifts to at least one root prime-length Zadoff-Chu sequence;
wherein said asynchronous random access signal is for requesting uplink resource allocation.

8. The method of claim 7 wherein:
a duration of said signal is determined independently for each network cell to optimize coverage performance.

9. The method of claim 7 further comprising:
determining the cyclic shifts increment applied to the at least one root prime-length Zadoff-Chu sequence independently for each telecommunication network cell.

10. The method of claim 7 further comprising:
transmitting at least one wide band pilot signal.

11. The method of claim 7 wherein:
said plurality of prime-length Zadoff-Chu sequences represents a plurality of information values related to a random access cause and/or an estimated radio channel quality.

12. The method of claim 7 wherein:
a duration of said random access signal is determined independently for each network cell to tune the total transmitted energy to compensate for the maximum propagation loss in the cell and optimize coverage performance.

13. The method of claim 7 wherein:
said plurality of prime-length Zadoff-Chu sequences represents a plurality of information values related to an identification of the transmitter; and
a random access cause and/or an estimated radio channel quality, wherein said information values are mapped to different prime-length Zadoff-Chu sequences or groups of prime-length Zadoff-Chu sequences.

14. The method of claim 7 wherein:
the prime-length Zadoff-Chu sequences are orthogonal.

15. A method of accessing a wireless network comprising:
transmitting a signal, said signal comprising a constant amplitude zero autocorrelation (CAZAC) sequence autonomously selected from a plurality of CAZAC sequences created by applying cyclic shifts to at least one root CAZAC sequence;
an integer number of frequency resource blocks are allocated for transmission of said signal; and
duration of said signal is an integer number of data symbols to ease multiplexing random access channel (RACH) and data by reducing orthogonality losses.

16. A method of accessing a wireless network comprising:
transmitting a signal, said signal comprising a constant amplitude zero autocorrelation (CAZAC) sequence autonomously selected from a plurality of CAZAC sequences created by applying cyclic shifts to at least one root CAZAC sequence, wherein: said plurality of CAZAC sequences is subdivided into groups comprising a non-contention use group and a contention use group.

17. A method of accessing a wireless network comprising:
transmitting a signal, said signal comprising a constant amplitude zero autocorrelation (CAZAC) sequence autonomously selected from a plurality of CAZAC sequences created by applying cyclic shifts to at least one root CAZAC sequence;
wherein the cyclic shifts applied to the at least one root CAZAC sequence are integer multiples of the maximum cell round trip delay added to the delay spread of the telecommunications network cell.

18. An apparatus for transmitting a random access signal, comprising:
an apparatus for autonomously selecting a signal x(u) and a cyclic shift c among a set of possible signals and cyclic shift values;
a Zadoff-Chu sequence generator used for generating the signal x(u);
a cyclic shifter, wherein the cyclic shifter uses the signal x(u) to produce a shifted signal y(u) =x[(u−c) mod U] and wherein c is the selected cyclic shift and U is the length of signal x(u); and
an asynchronous transmitter, wherein the asynchronous transmitter transmits the signal x(u) irrespective of the timing of the target remote receiver.

19. The apparatus of claim 18, wherein x(u) is a Zadoff-Chu sequence.

20. The apparatus of claim 18, further comprising:
a Discrete Fourier Transform (DFT) transformer coupled to the cyclic shifter, wherein the DFT transformer produces a frequency-domain signal.

21. The apparatus of claim 20, further comprising:
an inverse Discrete Fourier Transform (IDFT) transformer coupled to the DFT transformer, wherein the IDFT transformer produces a time-domain signal.

22. The apparatus of claim 21, further comprising:
a block repeater coupled to the IDFT transformer; wherein the block repeater replicates the time domain signal; and
a cyclic prefix inserter coupled to the block repeater.

23. The apparatus of claim 22, further comprising:
circuitry for receiving an indication of the number of repetitions used by the block repeater.

24. The apparatus of claim 21, further comprising:
a block repeater coupled to the IDFT transformer; wherein the block repeater replicates the time domain signal;
a cyclic prefix inserter coupled to the block repeater; and
circuitry for receiving an indication of the number of repetitions used by the block repeater.

25. The apparatus of claim 18, further comprising:
an inverse Discrete Fourier Transform (IDFT) transformer coupled to the Zadoff-Chu sequence generator, wherein the IDFT transformer produces a time-domain signal.

26. The apparatus of claim 25, wherein the time-domain signal is x(u).

27. The apparatus of claim 18, wherein x(u) is a prime-length Zadoff-Chu sequence.

28. The apparatus of claim 18, further comprising:
a Discrete Fourier Transform (DFT) transformer coupled to the cyclic shifter, wherein the DFT transformer produces a prime-length frequency-domain signal; and
a tone mapper for mapping a prime number of frequency tones onto a non-prime number of frequency tones coupled to the frequency transformer.

29. An apparatus for transmitting a random access signal, comprising:
an apparatus for autonomously selecting a signal x(u) and a cyclic shift c among a set of possible signals and cyclic shift values;
a Zadoff-Chu sequence generator used for generating the signal x(u);
a cyclic shifter; wherein the cyclic shifter uses the signal x(u) to produce a shifted signal y(u)=x[(u−c) mod U]; wherein c is the selected cyclic shift and U is the length of signal x(u), wherein the time-domain signal is x(u);
an inverse Discrete Fourier Transform (IDFT) transformer coupled to the Zadoff-Chu sequence generator; wherein the IDFT transformer produces a time-domain signal;
a block repeater coupled to the IDFT transformer; wherein the block repeater replicates the time domain signal; and
a cyclic prefix inserter coupled to the block repeater.

30. The apparatus of claim 29, further comprising:
an apparatus for receiving an indication of the number of repetitions used by the block repeater.

31. An apparatus for transmitting a random access signal, comprising:
an apparatus for autonomously selecting a signal x(u) and a cyclic shift c among a set of possible signals and cyclic shift values;
a Zadoff-Chu sequence generator used for generating the signal x(u);
a cyclic shifter, wherein the cyclic shifter uses the signal x(u) to produce a shifted signal y(u)=x[(u−c) mod U], and wherein c is the selected cyclic shift and U is the length of signal x(u);
an apparatus for producing random access OFDM symbols of duration T1, wherein T1 does not include the cyclic prefix duration; and
an apparatus for producing non-random access OFDM symbols of duration T2, wherein T2 does not include the cyclic prefix duration, and wherein T1 is an integer multiple of T2.

32. An apparatus for transmitting a random access signal, comprising:
an apparatus for autonomously selecting a signal x(u) and a cyclic shift c among a set of possible signals and cyclic shift values;
a Zadoff-Chu sequence generator used for generating the signal x(u);
a cyclic shifter, wherein the cyclic shifter uses the signal x(u) to produce a shifted signal y(u)=x[(u−c) mod U], and wherein c is the selected cyclic shift and U is the length of signal x(u); and
an apparatus for receiving an indication of c.

33. An apparatus for transmitting a random access signal, comprising:
an apparatus for autonomously selecting a signal x(u) and a cyclic shift c among a set of possible signals and cyclic shift values;
a Zadoff-Chu sequence generator used for generating the signal x(u);
a cyclic shifter, wherein the cyclic shifter uses the signal x(u) to produce a shifted signal y(u)=x[(u−c) mod U], and wherein c is the selected cyclic shift and U is the length of signal x(u); and
an apparatus for receiving an indication of the Zadoff-Chu sequence.

34. A method of accessing a wireless network, comprising:
autonomously selecting a Zadoff-Chu sequence x(u) and a cyclic shift c among a set of possible sequences and cyclic shift values;
generating a Random Access signal x(u) using a Zadoff-Chu sequence generator;
producing a cyclically shifted signal y(u)=x[(u−c) mod U], wherein c is the cyclic shift and U is the length of signal x(u), wherein x(u) is the Zadoff-Chu sequence;
producing a frequency-domain signal by transforming y(u) with a Discrete Fourier Transform (DFT);
extending the frequency-domain signal by padding zeros;
producing a time domain signal by transforming the extended frequency domain signal with an Inverse Discrete Fourier Transform (IDFT);
repeating the time domain signal;
inserting a cyclic prefix to the repeated time domain signal; and
broadcasting an indication of the number of repetitions of the time domain signal, wherein the number of repetitions is a cell-specific parameter.

35. A method of accessing a wireless network, comprising:
autonomously selecting a Zadoff-Chu sequence x(u) and a cyclic shift c among a set of possible sequences and cyclic shift values;
generating a Random Access signal x(u) using a Zadoff-Chu sequence generator;
producing a cyclically shifted signal y(u)=x[(u−c) mod U], wherein c is the cyclic shift and U is the length of signal x(u); and
frequency multiplexing random access OFDM symbols of duration T1 with non-random access OFDM symbols of duration T2, wherein T1 is an integer multiple of T2.

36. A method of accessing a wireless network, comprising:
autonomously selecting a Zadoff-Chu sequence x(u) and a cyclic shift c among a set of possible sequences and cyclic shift values;
generating a Random Access signal x(u) using a Zadoff-Chu sequence generator;
producing a cyclically shifted signal y(u)=x[(u−c) mod U], wherein c is the cyclic shift and U is the length of signal x(u);

estimating size of a cell in a wireless network;
producing c using the estimated size of the cell; and
broadcasting an indication of c.

37. A method of accessing a wireless network, comprising:
autonomously selecting a Zadoff-Chu sequence and a cyclic shift c among a set of possible sequences and cyclic shift values;
generating a Random Access signal x(u) using a Zadoff-Chu sequence generator; and
producing a cyclically shifted signal y(u)=x[(u−c) mod U], wherein c is the cyclic shift and U is the length of signal x(u), and wherein x(u) is the Zadoff-Chu sequence;
wherein said Random Access signal is for requesting uplink resource allocation.

38. A method of accessing a wireless network, comprising:
producing an element of information at a user equipment;
autonomously selecting a Zadoff-Chu sequence x(u) and a cyclic shift c among a set of possible sequences and cyclic shift values using the element of information;
generating a Random Access signal x(u) using a Zadoff-Chu sequence generator; and
producing a cyclically shifted signal y(u)=x[(u−c) mod U], wherein c is the cyclic shift and U is the length of signal x(u);
wherein said Random Access signal is for requesting uplink resource allocation.

39. The methods of claim 38, further comprising:
estimating quality of a radio link, wherein the element of information is produced using the estimated radio link quality.

40. A method of accessing a wireless network, comprising:
autonomously selecting a Zadoff-Chu sequence x(u) and a cyclic shift c among a set of possible sequences and cyclic shift values;
generating a Random Access signal x(u) using a Zadoff-Chu sequence generator;
producing a cyclically shifted signal y(u)=x[(u−c) mod U], wherein c is the cyclic shift and U is the length of signal x(u);
receiving the random access signal;
estimating a frequency response of an uplink transmission using the received Random Access signal; and
allocating up-link resources based on said frequency response estimation.

41. A method of accessing a wireless network, comprising:
estimating size of a cell in a wireless network;
producing a primitive cyclic shift value C using the estimated size of the cell;
broadcasting an indication of C;
autonomously selecting a Zadoff-Chu sequence x(u) among a set of possible sequences and a cyclic shift c among a set of possible cyclic shift values built as integral multiples of C;
generating a Random Access signal x(u) using a Zadoff-Chu sequence generator; and
producing a cyclically shifted signal y(u)=x[(u−c) mod U], wherein c is the cyclic shift and U is the length of signal x(u).

* * * * *